(12) United States Patent
Sasaki et al.

(10) Patent No.: US 7,316,518 B2
(45) Date of Patent: Jan. 8, 2008

(54) CLOSURE FOR CABLE CONNECTION

(75) Inventors: Daijiro Sasaki, Tokyo (JP); Kinji Mineshima, Higashimatsuyama (JP); Akira Nishimura, Machida (JP); Koji Yamagiwa, Maebashi (JP); Tetsuya Hoshijima, Tsukuba (JP); Yoshiyuki Yoshii, Yachiyo (JP)

(73) Assignees: Japan Recom Ltd. (JP); Nippon Telegraph and Telephone Corporation (JP)

( * ) Notice: Subject to any disclaimer, the term of this patent is extended or adjusted under 35 U.S.C. 154(b) by 0 days.

(21) Appl. No.: 08/799,400

(22) Filed: Feb. 12, 1997

(65) Prior Publication Data

US 2003/0026647 A1    Feb. 6, 2003

(51) Int. Cl.
*H01R 4/00* (2006.01)

(52) U.S. Cl. .......................... 403/344; 174/92; 174/93; 174/88 R; 439/460; 403/195; 403/196; 403/310; 403/313

(58) Field of Classification Search ................ 403/192, 403/196, 197, 256, 288, 287, 286, 309, 310, 403/311, 312, 313, 195; 174/92, 93, 88 R; 439/460, 587
See application file for complete search history.

(56) References Cited

U.S. PATENT DOCUMENTS

| | | | | |
|---|---|---|---|---|
| 2,803,696 A | * | 8/1957 | Heffner ..................... | 174/92 X |
| 3,622,939 A | * | 11/1971 | Forney, Jr. ................. | 339/89 C |
| 3,745,233 A | * | 7/1973 | Lania et al. ............ | 174/113 R |
| 3,795,757 A | * | 3/1974 | Higgins ..................... | 174/72 R |
| 3,806,628 A | * | 4/1974 | Higgins ..................... | 174/72 R |
| 4,262,167 A | * | 4/1981 | Bossard et al. ............... | 174/92 |
| 4,332,435 A | * | 6/1982 | Post .......................... | 350/96.2 |
| 4,361,721 A | * | 11/1982 | Massey ....................... | 174/92 |
| 4,496,795 A | * | 1/1985 | Konnik ..................... | 174/84 R |
| 4,538,021 A | | 8/1985 | Williamson, Jr. | |
| 4,558,174 A | | 12/1985 | Massey | |
| 4,622,092 A | * | 11/1986 | Bohannon, Jr. et al. .... | 156/461 |
| 4,693,538 A | * | 9/1987 | Matsuo ....................... | 439/460 |
| 4,808,772 A | | 2/1989 | Pichler et al. | |
| 4,810,829 A | * | 3/1989 | Rutenbeck et al. ....... | 174/92 X |
| 4,839,471 A | * | 6/1989 | Clark et al. .................. | 174/92 |
| 4,845,314 A | * | 7/1989 | Pichler et al. ................ | 174/92 |
| 4,857,672 A | * | 8/1989 | Rebers et al. ................. | 174/93 |
| 4,859,812 A | * | 8/1989 | Klosin et al. ............ | 174/93 X |

(Continued)

FOREIGN PATENT DOCUMENTS

EP    0 316 911 A    5/1989

(Continued)

*Primary Examiner*—James M. Hewitt
*Assistant Examiner*—Michael P. Ferguson
(74) *Attorney, Agent, or Firm*—Lerner, David, Littenberg, Krumholz & Mentlik, LLP

(57) ABSTRACT

A closure for cable connection capable of being readily assembled with fastening force of a sufficient level, rapidly accomplishing leading-out of a cable from a cable connection section and storage of the cable, and exhibiting enhanced airtightness while exhibiting increased reliability. The closure includes sleeve members and end plates. The end plates are each provided with slits which extend from cable guide holes to an outer surface of the end plate. Each cable guide hole is provided thereon with a thin-wall cap and the slit is detachably fitted therein with a rigidity holding member. An adhesive tape-like gasket is interposed between an outer periphery of the end plate and an inner surface of a sleeve so as to cover an outer end portion of the slit.

33 Claims, 37 Drawing Sheets

U.S. PATENT DOCUMENTS

| | | | |
|---|---|---|---|
| 4,933,512 A * | 6/1990 | Nimiya et al. | 174/92 |
| 5,046,766 A * | 9/1991 | Lomberty et al. | 285/419 |
| 5,113,038 A * | 5/1992 | Dehling | 174/92 |
| 5,155,303 A | 10/1992 | Bensel, III et al. | |
| 5,245,133 A * | 9/1993 | DeCarlo et al. | 174/93 |
| 5,322,973 A | 6/1994 | Dagan | |
| 5,446,823 A | 8/1995 | Bingham et al. | |
| 5,450,518 A | 9/1995 | Burek et al. | |
| 5,577,930 A * | 11/1996 | Dahlem et al. | 439/460 X |
| 5,844,171 A * | 12/1998 | Fitzgerald | 174/92 |
| 5,883,333 A * | 3/1999 | Wambeke et al. | 174/92 |
| 6,037,544 A * | 3/2000 | Lee et al. | 174/92 |
| 6,051,792 A * | 4/2000 | Damm et al. | 174/92 X |
| 6,071,145 A * | 6/2000 | Toly | 439/485 |
| 6,177,634 B1 * | 1/2001 | Smith | 174/92 |
| 6,218,620 B1 * | 4/2001 | Michel | 174/92 |
| 6,226,434 B1 * | 5/2001 | Koshiyama et al. | 385/134 |
| 6,231,051 B1 * | 5/2001 | Mueller et al. | 277/603 |
| 6,248,953 B1 * | 6/2001 | Miller | 174/74 R |
| 6,283,670 B1 * | 9/2001 | Blankmanship et al. | 403/313 |
| 6,359,228 B1 * | 3/2002 | Strause et al. | 174/91 |
| 6,376,774 B1 * | 4/2002 | Oh et al. | 174/92 |
| 6,407,338 B1 * | 6/2002 | Smith | 174/92 |
| 6,573,455 B1 * | 6/2003 | Radelet | 174/92 |
| 2002/0146229 A1 * | 10/2002 | Roberts | 385/135 |
| 2002/0180163 A1 * | 12/2002 | Muller et al. | 277/602 |

FOREIGN PATENT DOCUMENTS

| | | |
|---|---|---|
| JP | 8-237847 | 9/1996 |
| JP | 8-237848 | 9/1996 |
| JP | 8-237849 | 9/1996 |
| JP | 8-237850 | 9/1996 |
| JP | 8-237851 | 9/1996 |
| JP | 8-237852 | 9/1996 |
| JP | 8-242526 | 9/1996 |
| WO | WO 96 08855 | 3/1996 |

* cited by examiner

FIG. 13A
FIG. 13B
FIG. 13C
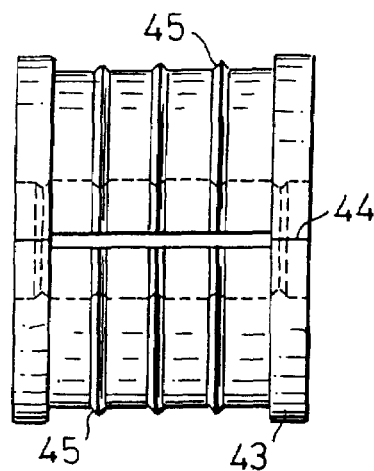
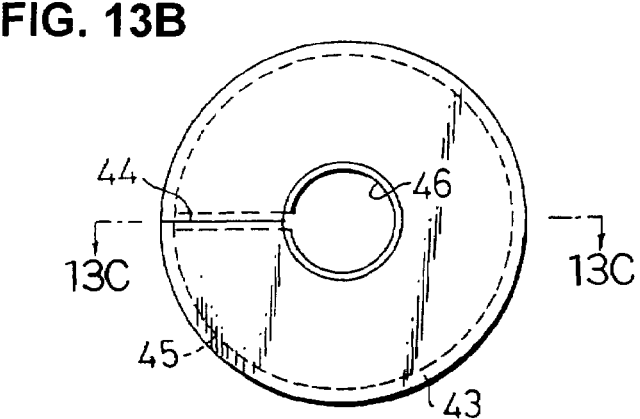
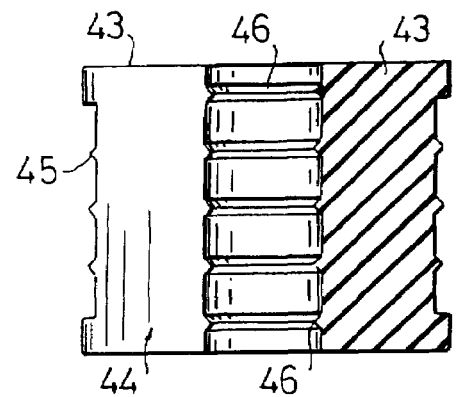

FIG. 16A FIG. 16B
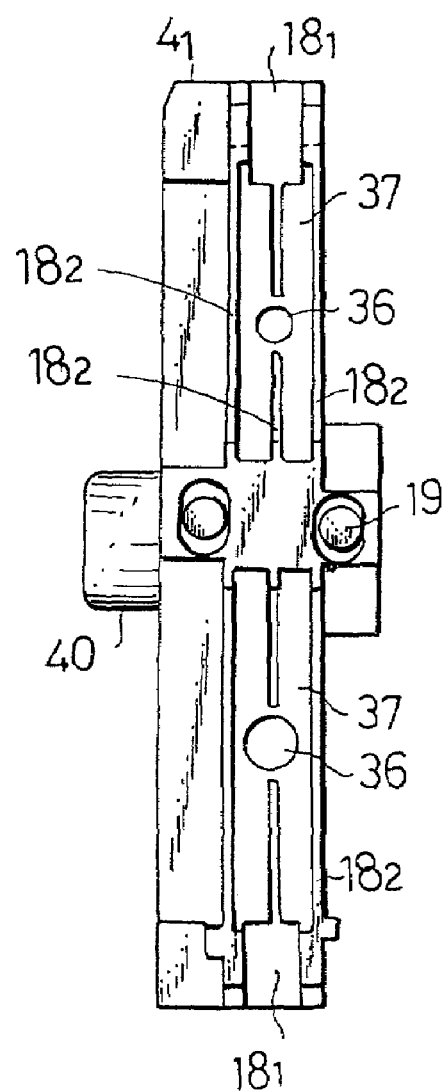
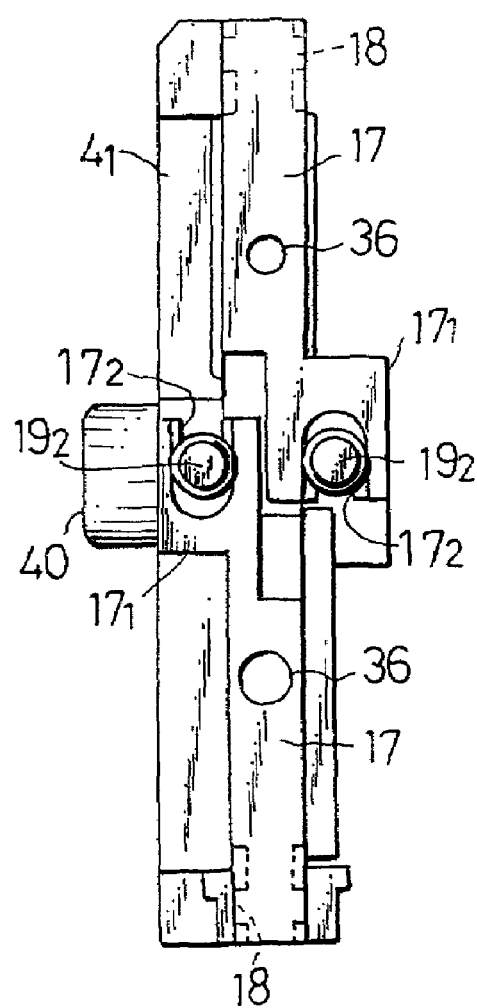

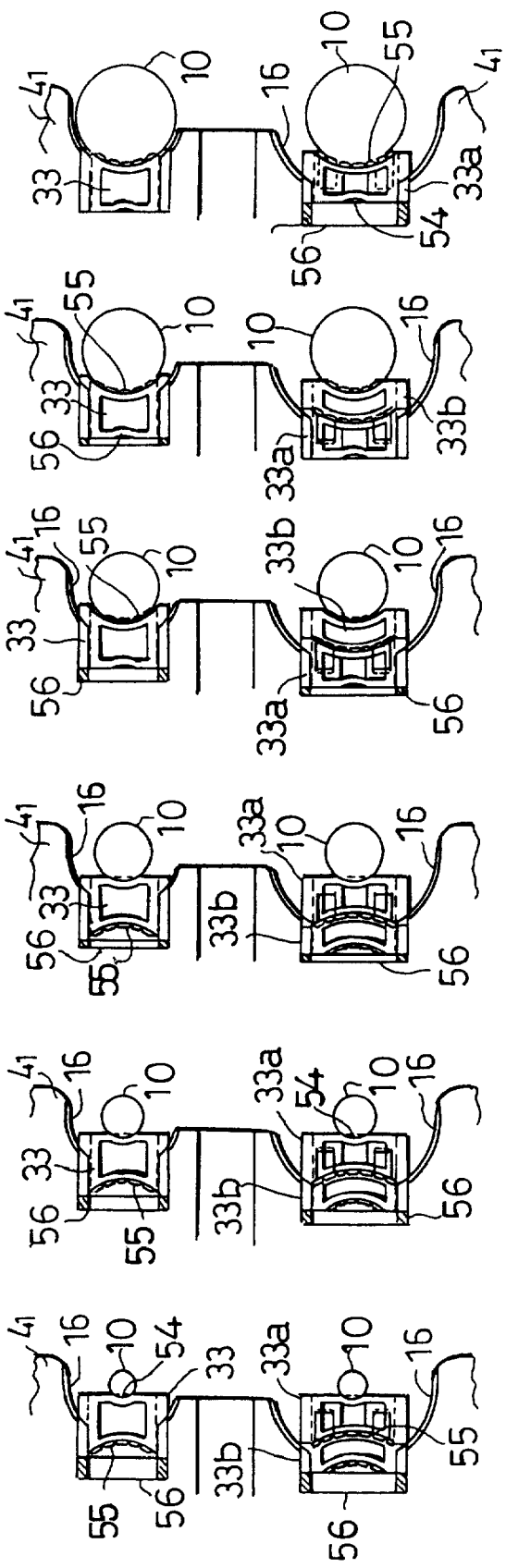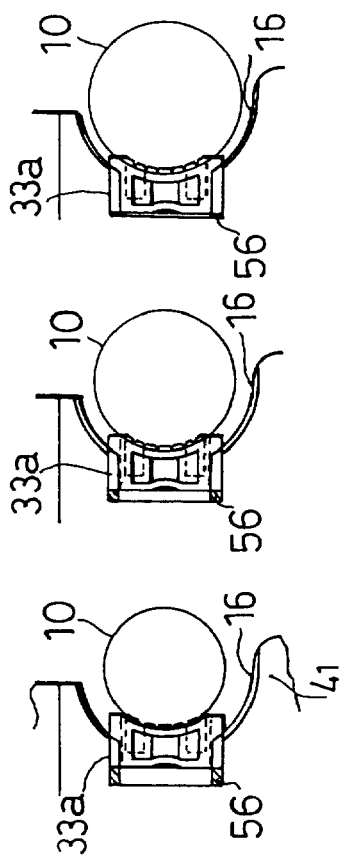

CLOSURE FOR CABLE CONNECTION

BACKGROUND OF THE INVENTION

This invention relates to a closure for protection of a connection section or splicing section of a communication cable such as an optical fiber cable or the like, and more particularly to an improvement in a closure for cable connection for an optical fiber cable.

In general, a closure for cable connection includes end plates through which cables with a cable connection section being interposed therebetween are inserted and a cylindrical sleeve formed of two split parts so as to cover the cable connection section and constructed in a manner to be split in a longitudinal direction. The two parts for the sleeve arranged between the end plates are joined to each other through abutting portions thereof opposite to each other using any suitable fixing means such as a bolt, a band or the like, resulting in providing the sleeve for airtightly protecting the cable connection section.

The conventional sleeve thus constructed for protecting the cable connection section is required to exhibit rigidity sufficient to prevent deformation of the sleeve and properties sufficient to prevent intrusion of moisture thereinto. For this purpose, the sleeve is so constructed that components of the sleeve are intimately or tightly coupled to each other and coupling between the cable and the sleeve is likewise tightly carried out. Unfortunately, such construction of the conventional sleeve causes setting of the cable led out of the end plates and handling of the sleeve to be substantially troublesome. Also, the conventional sleeve has another disadvantage of requiring a cable storage provided with an airtight member in order to ensure sufficient fastening of the cable. However, this renders manufacturing of the sleeve troublesome and costly and deteriorates durability of the sleeve. Further, in order to ensure that the conventional sleeve exhibits satisfactory airtightness, force for fastening the end plates must be strictly controlled and assembling of the sleeve is rendered laborious and time-consuming.

In the conventional closure, a support wire or a cable, such as an aerial wire, a trunk cable or the like is fixed in the closure by a cable clamp. The cable clamp is formed with cable guide recesses each of which permits a cable of a maximum diameter to be fitted therein. Accordingly, when a cable of a small diameter is fixed by such a cable clamp, it is necessary to interpose a spacer or bush of a predetermined size between the cable and the cable guide recess or to wind a required number of turns of a tape having a certain thickness around the cable.

Such adjustment of an outer diameter of the cable with respect to the cable guide recess has conventionally been carried out at site, and thus replacement of the spacer or rewinding of the tape is highly troublesome. In addition, it is necessary to keep a number of spacers or bushes which have cable inserting holes of different diameters in correspondence to cables of various outer diameters and to select among them.

SUMMARY OF THE INVENTION

The present invention has been made in view of the foregoing disadvantages of the prior art.

Accordingly, it is an object of the present invention to provide a closure for cable connection which is capable of preventing deformation of a storage for a cable connection section.

It is another object of the present invention to provide a closure for cable connection which is capable of facilitating introduction and setting of a cable with respect to the closure while enhancing both safety and airtightness of the closure.

It is a further object of the present invention to provide a closure for cable connection which is capable of readily and positively accomplishing fixing of a cable with respect to the closure.

It is still further object of the present invention to provide a closure for cable connection which is capable of substantially increasing workability in assembling of the closure.

It is still another object of the present invention to provide a closure for cable connection which is capable of reducing the number of components to be replaced during installation or maintenance.

It is yet another object of the present invention to provide a closure for cable connection which is capable of being significantly simplified in construction and reduced in manufacturing cost.

In accordance with the present invention, a closure for cable connection is provided. The closure for cable connection generally includes a pair of sleeve members which are formed with a semicylindrical shape and joined to each other in a manner to be vertically separable from each other, resulting in providing a cylindrical sleeve for surrounding a cable connection section and have abutting joint surfaces formed on both sides thereof, through which the sleeve members are joined together; end plates arranged on opposite ends of the sleeve and each formed with at least one cable guide hole through which a cable connected to the cable connection section is inserted; and hinges and fasteners releasibly hooked between the sleeve members to integrally connect the sleeve members to each other through the abutting joint surfaces arranged opposite to each other. In the closure of the present invention thus generally constructed, the end plates are each formed with a slit in a manner to extend from the cable guide hole to a portion of the end plate in proximity to an outer periphery of the end plate so as to permit a wall of the end plate to open by cutting along the slit. The cable guide hole is provided thereon with a thin-wall cap capable of being removed by cutting and the slit is detachably fitted therein with a rigidity holding member. The closure also includes an adhesive tape-like gasket interposed between the outer periphery of the end plate and an inner surface of the sleeve so as to cover an outer end of the slit.

In the closure for cable connection according to the present invention thus constructed, a jacket is removed by a required length from a cable and an internal slot rod is cut off by a predetermined dimension from a position of the cable at which removal of the jacket was carried out, followed by adjusting of tension members in a predetermined dimension, resulting in preliminary arrangement for cable connection being completed. Then, the jacket at a predetermined position of the cable is subjected to polishing and cleaning in a circumferential direction thereof and the rigidity holding member is removed from the cable guide hole of each of the end plates and then the thin-wall cap is removed from the cable guide hole and the slit is opened. Then, the slit is expanded to guide the cable through the expanded slit to the cable guide hole, to thereby insert the cable through the cable guide hole. Subsequently, the slit is mounted therein with a seal member and then fitted therein with an opening prevention connection member, to thereby keep the slit closed, followed by adhesion of the adhesive tape-like gasket to the outer periphery of the end plate so as to cover an end portion of the slit positioned contiguous to the outer periphery while being conformed thereto. Thereafter, spacers having an inner diameter required for a cable clamp are fitted in the cable guide recess and curved holding member to fasten the jacket at the end of the cable to the cable clamp and fasten the tension members to a cable tension member clamp of a tension member clamp. Then, the upper sleeve member is pivotally moved about each of the hinges on one side of the lower sleeve member while being kept held on the lower sleeve member by means of the hinges, resulting in the upper sleeve member being placed on the lower sleeve member while forcing the end plates against the lower sleeve member. Thereafter, the fasteners are fastened in order from a central portion of the sleeve members, to thereby provide the closure.

The closure thus assembled permits mounting of a cable seal member and that of the end plates to be strengthened while stabilizing a posture of the closure and airtightness of the closure to be highly increased, so that charging of gas into the cable connection closure through a valve ensures that it satisfactorily exhibits its inherent function.

Also, release of the fasteners permits the upper sleeve member to be readily pivotally moved about the hinges, resulting in the sleeve being open, so that a cable connection operation in the closure may be facilitated.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like or corresponding parts throughout; wherein:

FIG. 13A is a side elevation view showing an example of a spacer incorporated in a closure for cable connection according to the present invention;

FIG. 13B is a front elevation view of the spacer shown in FIG. 13A;

FIG. 13C is a plan view in section taken along line 13C-13C of FIG. 13B;

FIG. 16A is a side elevation view showing a clamp body of the cable clamp shown in FIG. 14, from which a curved holding member is deleted;

FIG. 16B is a side elevation view of the clamp body shown in FIG. 16A which has a curved holding member incorporated therein;

FIGS. 26A to 26I are partial front elevation views each showing arrangement of the holding spacers incorporated in the cable clamp;

DETAILED DESCRIPTION OF THE PREFERRED EMBODIMENTS

Figure 1:
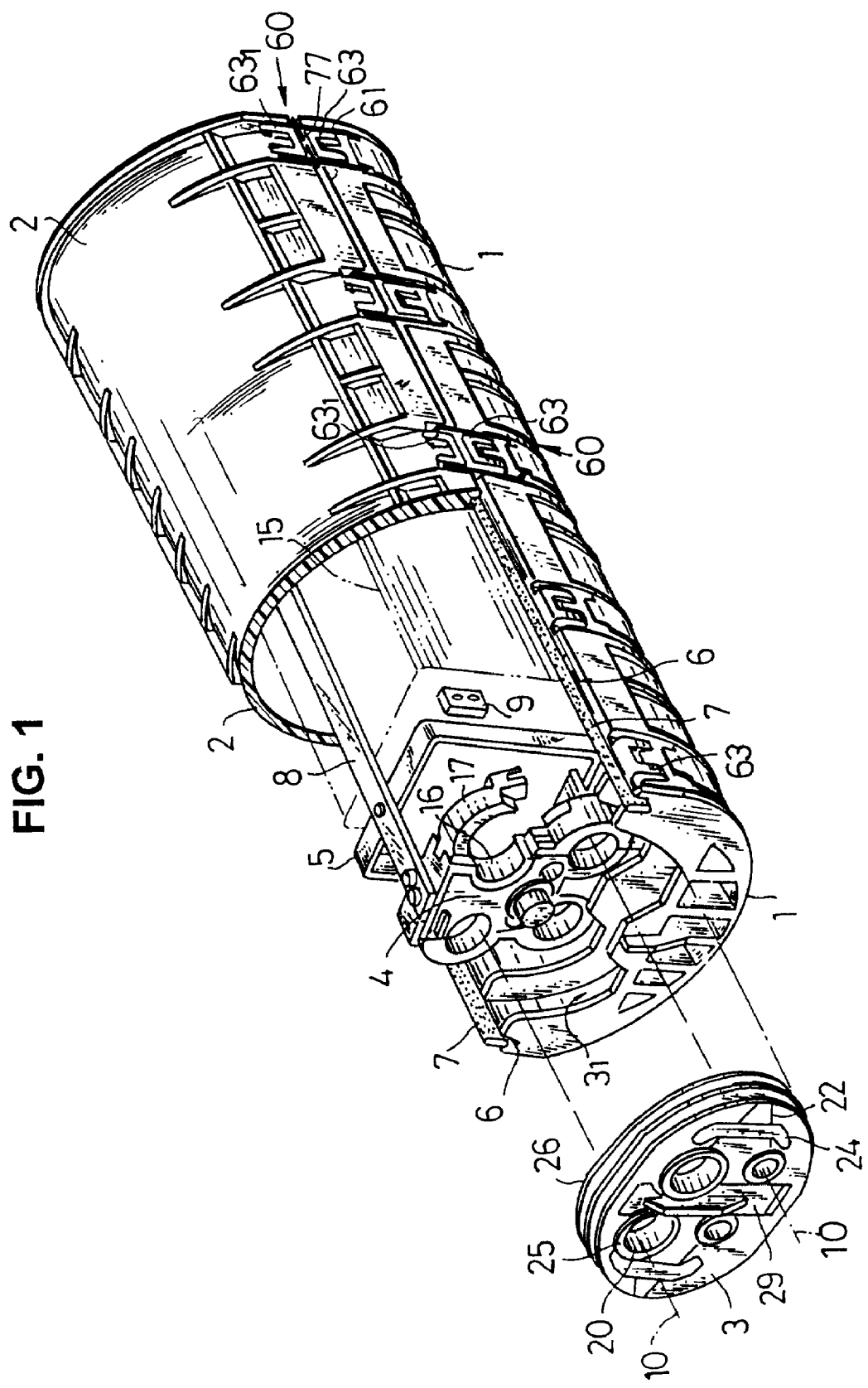
FIG. 1 is a partially exploded cut-away perspective view showing an embodiment of a closure for cable connection according to the present invention.
Figure 2:
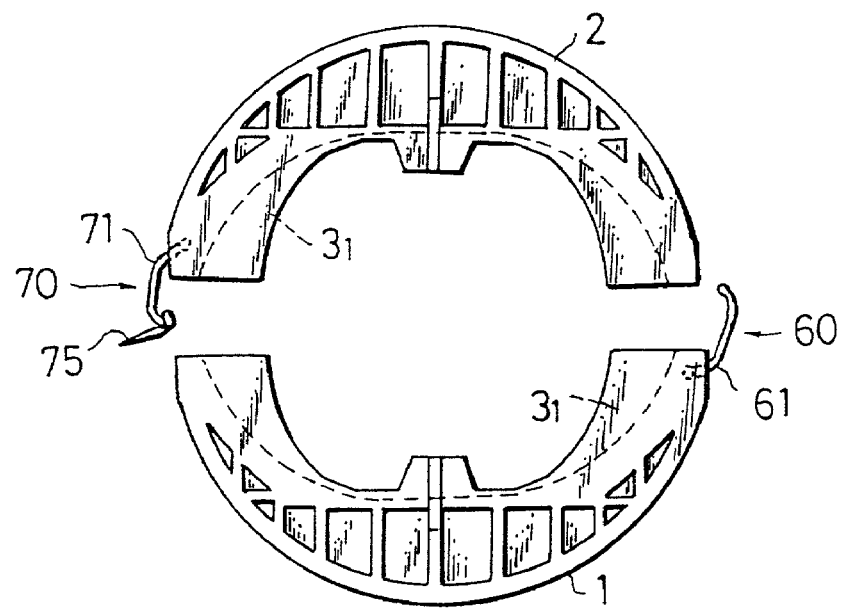
FIG. 2 is an exploded front elevation view showing a sleeve which may be incorporated in the closure of FIG. 1.

Now, a closure for cable connection according to the present invention will be described hereinafter with reference to the accompanying drawings.

Referring first to FIGS. 1 to 6, an embodiment of a closure for cable connection according to the present invention is illustrated. Generally, a closure for cable connection according to the illustrated embodiment includes a cylindrical sleeve constructed of a lower sleeve member 1 and an upper sleeve member 2, as well as end plates 3 respectively fitted in end fitment portions $3_1$ provided on opposite ends of the sleeve in a longitudinal direction thereof. The end plates 3 are each adapted to permit at least one trunk optical fiber cable 10 to pass therethrough. The closure of the illustrated embodiment also includes at least one cable clamp 4 for securing the trunk optical fiber cable 10 with respect to the closure and at least one tension member holder 5 which is adapted to have a tension member (not shown) of the cable 10 connected thereto. The lower and upper sleeve members 1 and 2 of the cylindrical sleeve are each made of a synthetic resin material such as, for example, PP resin, flame-retardant FRPP resin filled with glass fiber, a thermoplastic elastomer or the like with a semicylindrical shape and joined to each other so as to be vertically separable from each other, resulting in providing the cylindrical sleeve. For this purpose, the lower and upper sleeve members 1 and 2 have abutting joint surfaces formed on both sides thereof, respectively, through which the sleeve members 1 and 2 are joined together. The end plates 3 respectively fitted in the end fitment portions $3_1$ provided on both ends of the thus-formed cylindrical sleeve may each be made of a suitable rubber plate material such as an EPDM plate material or the like which satisfactorily exhibits desired properties such as weatherability, ozone resistant properties and the like.

The abutting joint surfaces of each of the lower and upper sleeve members 1 and 2, including a portion thereof adapted to be brought into contact with an outer periphery of each of the end plates 3, are provided thereon with recessed grooves 6 in a manner to extend in a longitudinal direction thereof or in an axial direction of the sleeve, in which gaskets 7 are fittedly held as shown in FIG. 1. The sleeve is provided therein with the cable clamp 4 in a manner to be opposite to one of the end plates 3. The cable clamp 4 includes curved holding members 17 each of which is adapted to conform to an outer periphery of the cable. Also, the sleeve is provided therein with a connection fitment 8 including the tension member holder 5 and at least one tension member connector 9.

The gasket 7 fitted in each of the recesses 6 on both sides of the lower and upper sleeve members 1 and 2 is made of an elastic material such as a rubber material or the like and formed with an elliptic configuration in cross section. The gasket 7 is arranged in the recess 6 while being compressed in such a manner that a major axis of a cross section of the gasket 7 is rendered perpendicular to the abutting joint surface of the sleeve member or a width direction of the recess 6. This results in sealing between the lower sleeve member 1 and the upper sleeve member 2 being provided.

Figure 4:
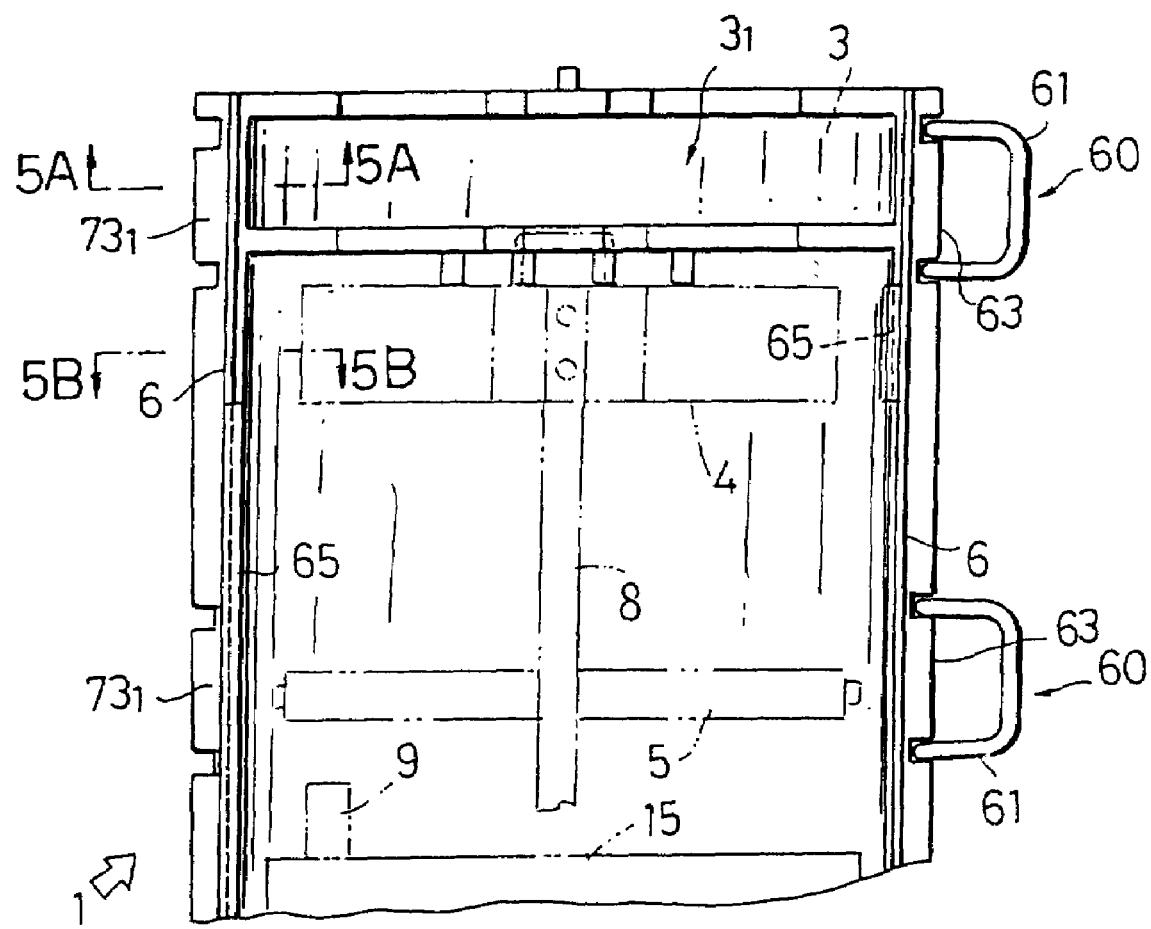
FIG. 4 is a fragmentary plan view showing a lower sleeve member of a sleeve which may be incorporated in the closure of FIG. 1.
Figure 5A:
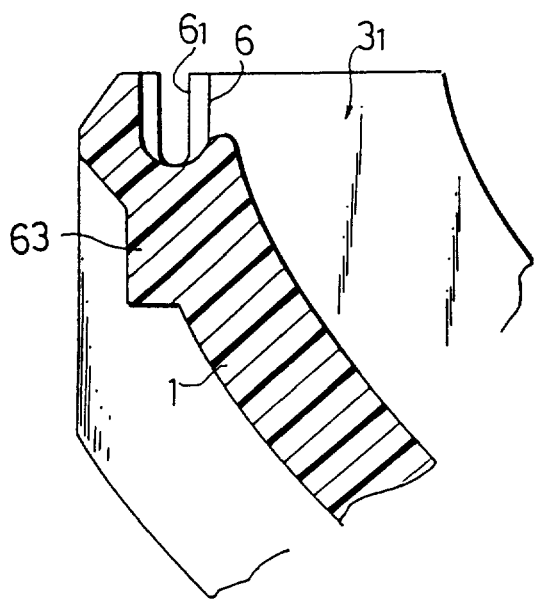
FIG. 5A is an enlarged cross-sectional view taken along line 5A-5A of FIG. 4.
Figure 5B:
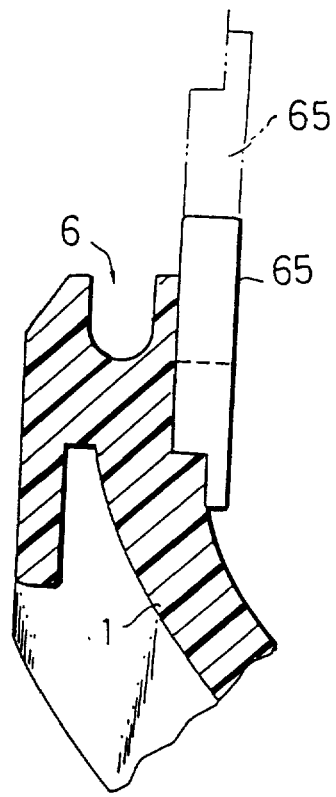
FIG. 5B is an enlarged cross-sectional view taken along line 5B-5B of FIG. 4.
Figure 6A:
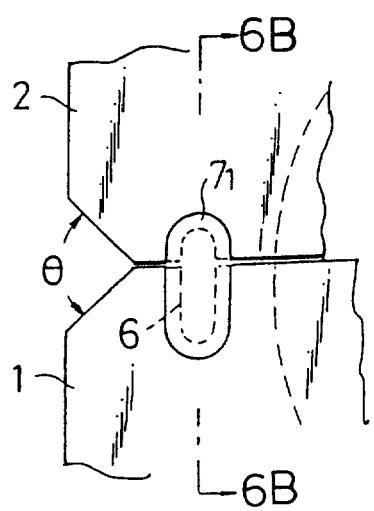
FIG. 6A is a fragmentary front elevation view showing a gasket section which may be constructed in a closure for cable connection according to the present invention.
Figure 6B:
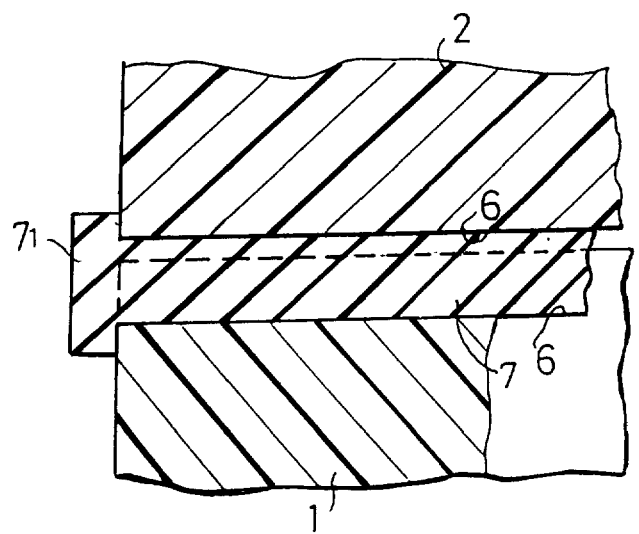
FIG. 6B is a side elevation view in section taken along line 6B-6B of FIG. 6A.
Figure 7:
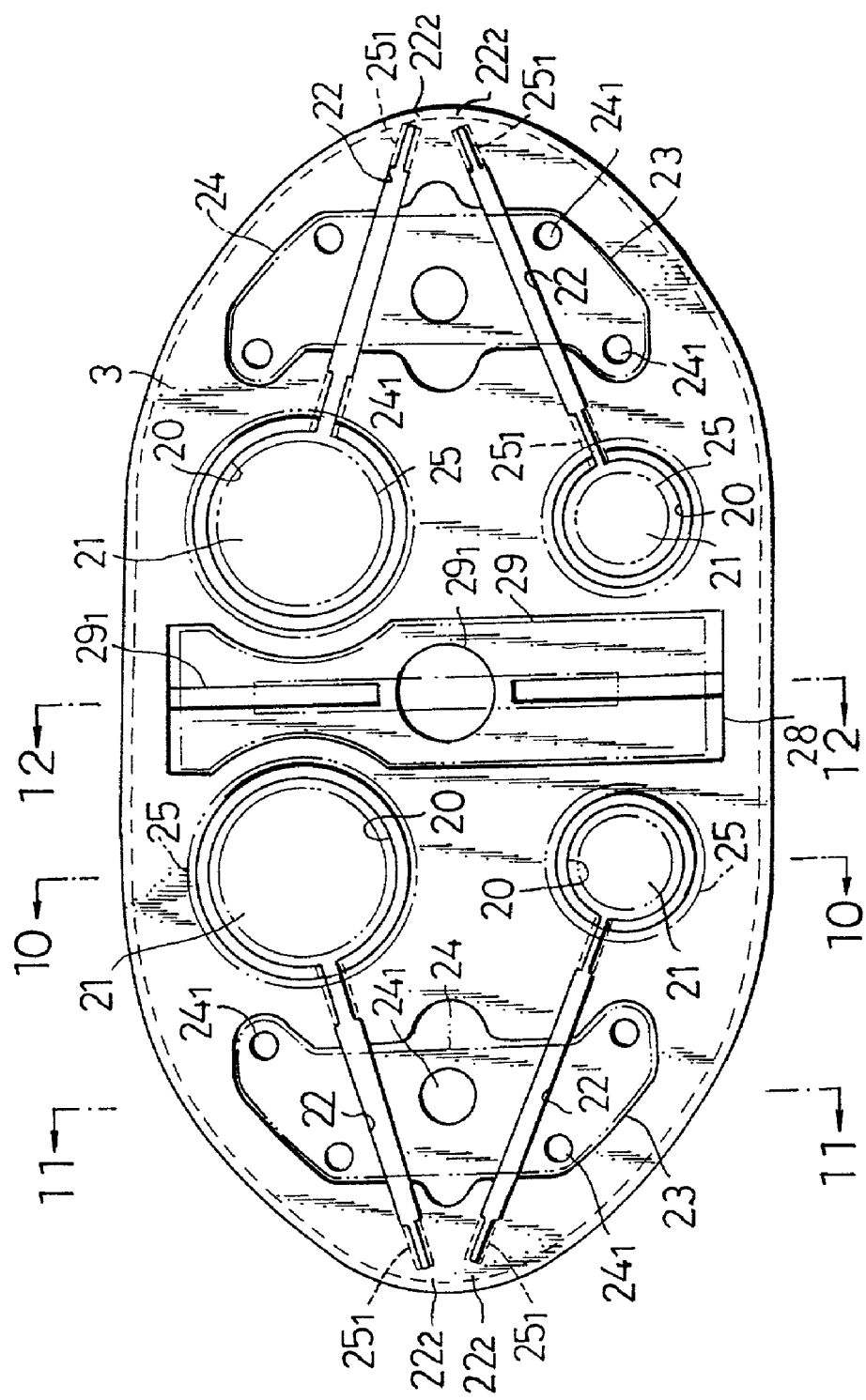
FIG. 7 is an enlarged front elevation view showing an end plate which may be incorporated in a closure for cable connection according to the present invention.

The recesses 6, as shown in FIGS. 4 to 6, are each so formed that both ends thereof are reduced in width, to thereby provide a gasket press-fit portion $6_1$ for pressedly fittedly holding the gasket 7 therein. Thus, fitting of the gasket in each of the recesses 6 is carried out by pressedly fitting both ends of the gasket 7 in the gasket press-fit portions $6_1$ of the recess 6 while elongating it, to thereby provisionally or temporarily fix the gasket 7 in the recess 6. This results in fitting of the gasket 7 in the recess 6 being positively accomplished while preventing undesired missing of the gasket 7 from the recess 6 and leaning of the gasket 7. The gasket 7 may be provided on each of both ends thereof with a flange $7_1$ as required. The flanges $7_1$ may be pressedly abutted against outer ends of the lower and upper sleeve members 1 and 2, to thereby temporarily fix the gasket 7 in the recess 6.

Also, the upper sleeve member 2 and lower sleeve member 1 are each provided with barriers 65 at different portions thereof defined along the recesses 6 and on both side edges thereof deviated from each other in a longitudinal direction thereof. During assembling of both sleeve members 1 and 2 into the sleeve, the sleeve members are joined together while mutually abutting the barriers 65 of each of the sleeve members against an inner surface of the other sleeve member, resulting in deviation of the upper and lower sleeve members 2 and 1 from each other in a horizontal direction thereof being effectively prevented.

The upper and lower sleeve members 2 and 1 are vertically separably joined to each other while interposedly sealedly holding the gaskets 7 therebetween and interposedly arranging sealing members between the sleeve members and the end plates 3, resulting in ensuring airtightness in the closure. The upper and lower sleeve members 2 and 1 are integrally connected to each other through the abutting joint surfaces thereof using fixing or fastening means. More specifically, the upper and lower sleeve members 2 and 1 are integrally connected together by means of hinges 60 each formed of a loop-like ring 61 and fasteners 70 each formed of a loop-like ring 71. The loop-like rings 61 and 71 are each arranged so as to releasably fasten the sleeve members 1 and 2 to each other.

Figure 3:
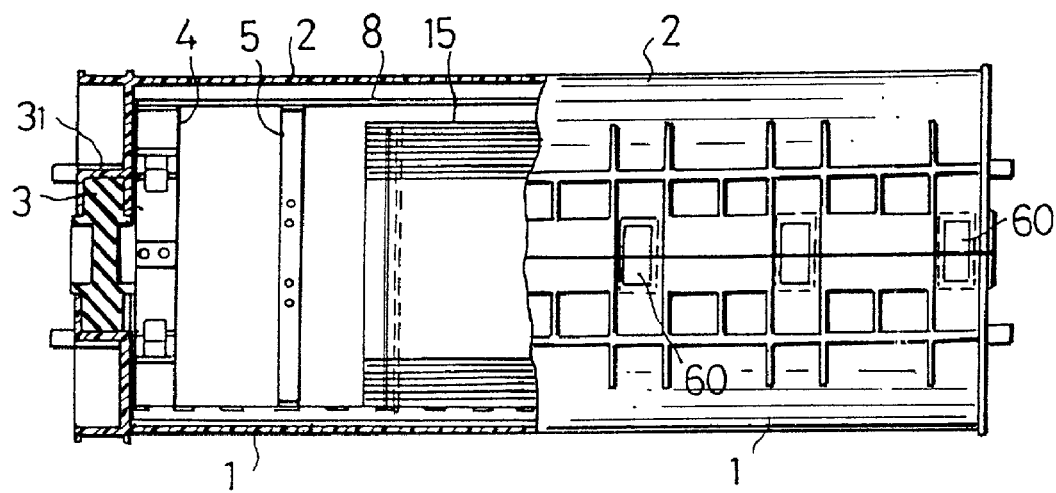
FIG. 3 is a partially cut-away side elevation view showing the closure of FIG. 1 which is kept assembled.

Also, the cable clamp 4 is mounted on each of both ends of the connection fitment 8 fixed with respect to the lower sleeve member 1 while being rendered opposite to an inner surface of one of the end plates 3 and then the tension member clamp 5 are mounted on the connection fitment 8 by means of fixing screws. This results in ensuring distribution and guide of fiber cables for connection thereof. Also, the sleeve is provided therein with at least one fiber cable storage unit such as, for example, at least one storage tray 15 so as to be positioned at a middle portion thereof. Also, the sleeve is mounted thereon with the tension member connectors 9 as shown in FIGS. 1, 3 and 4.

Each of the end plates 3, as shown in FIGS. 7 to 12, is constructed of a rubber elastic material of a round shape such as an elliptic shape, a prolonged oval shape, a circular shape or the like and formed with at least one cable insertion or guide hole 20. In the illustrated embodiment, four such cable guide holes 20 are provided. The cable guide holes 20 may be formed with the same diameter or different diameters. The end plates 3 are each provided thereon with caps 21 of a reduced wall thickness for covering the respective cable guide holes 20. The caps 21 are each arranged on the end plate 3 in a manner to be capable of being removed by cutting from the end plate 3. Also, the end plates 3 are each formed with slits 22 in a manner to correspond to the cable guide holes 20, respectively. The slits 22 are each so arranged that one end thereof communicates with the corresponding cable guide hole 20 and the other end thereof extends to a portion of the end plate 3 in proximity to the outer periphery thereof. Also, the slits 22 are each arranged so as to obliquely extend in a direction inclined with respect to a horizontal direction. The slits 22 are each closed on one side thereof and at an outer periphery thereof with thin wall elements $22_1$ and $22_2$, respectively, when the cable 10 is not inserted through the cable guide hole 20 corresponding thereto. When the cable 10 is inserted through the cable guide hole 20, the cap 21 for covering the hole 20 is removed by cutting and the thin wall elements $22_1$ and $22_2$ of the end plate 3 are cut open along the slit 22, resulting in an end of the slit 22 being enabled to be widely opened. This permits workability of cable connection and airtight properties thereof to be significantly enhanced.

Each of the slits 22 and each of the cable guide holes 20 which do not have a cable inserted therethrough are removably fitted therein with a rigidity holding seal member $25_1$ and a rigidity holding member 25, respectively. Also, each of the end plates 3 is formed on both lateral sides thereof with a pair of recesses 23. The recesses 23 are each securely fitted therein with an opening prevention connection member 24, which is arranged so as to vertically extend over both sides of each slit 22, to thereby prevent opening of the end plate 3. The end plate 3 is also formed at a central portion thereof interposed between the cable guide holes 20 in two pairs with a recess 28, which is securely fitted therein with a rigidity holding member 29, which is arranged so as to be abutted against an end wall of the sleeve. The connection member 24 fitted in each of the recesses 23 functions as an opening prevention fitment for preventing opening of the outer periphery of the end plate 3 and displacement thereof, when the slit 22 is cut open or expanded to insert the cable 10 through the cable guide hole 20 and then closed again. The opening prevention connection members 24 and rigidity holding member 29, which are respectively held in the recesses 23 and 28 formed on an outer surface of the end plate 3, are provided on surfaces thereof facing the end plate 3 with mating engagements $24_2$ and $29_2$, respectively. The mating engagements $24_2$ and $29_2$ respectively engage with recesses $24_1$ and $29_1$ formed on the end plate 3, to thereby function to positively hold the members 24 and 29 on the end plate 3, so that the members may be substantially prevented from being released therefrom.

Insertion of the cable through the end plate 3 is carried out by removing the rigidity holding member 25 from the cable guide hole 20 through which the cable is to be inserted, selectively removing the thin-wall cap 21 by cutting from the cable guide hole 20 to open the hole 20, cutting the thin wall elements $22_1$ and $22_2$ of the end plate 3 to the outer periphery of the slit 22 along the slit 22 communicating with the cable guide hole 20, to thereby enable an outer end of the slit 22 to be widely opened, and then laterally inserting the cable 10 through the opened slit 22 toward the cable guide hole 20. Then, the cable is inserted through the cable guide hole 20, to thereby cause the slit 22 to be returned to the original configuration, into which the seal member $25_1$ is inserted, followed by adhesion of the seal member $25_1$ to the slit 22 by means of an adhesive as required. Then, the opening prevention connection member 24 is mounted in the recess 23, so that both sides of the end plate 3 with the slit 22 being interposed therebetween are fastened. When the end plate 3 is formed with a small size, it is not necessarily required to arrange the rigidity holding member 25. Also, when the end plate 3 is provided with one or two such cable guide holes 20 in a manner to be positioned on a horizontal central line thereof, the slits 22 may be provided along the horizontal central line.

Further, the end plates 3 are each provided on an outer peripheral surface thereof with a plurality of peak-and-valley shaped grooves 26 in a manner to extend in a circumferential direction thereof, to thereby permit compression force to be produced between the inner surface of the sleeve and the end plate 3, resulting in airtightness of the closure being enhanced. Also, such construction permits the compression force to be inwardly transmitted, to thereby provide satisfactory airtightness between the cable 10 and the end plate 3 at a cable lead-out hole or at the cable guide hole 20 thereof. In addition, an adhesive tape-like gasket 11, 11e, a gasket including an adhesive made of an unvulcanized butyl rubber material is arranged locally between the outer periphery of the end plate 3 and an inner surface of the end fitment portion $3_1$ of the sleeve so as to cover an outer end portion of the slit 22 positioned contiguous to the outer periphery of the end plate 3. The tape-like gasket 11 is provided by adhesion thereof to the outer periphery of the end plate 3 while being conformed to the outer periphery of the end plate 3 including the peak-and-valley shaped grooves 26. Thus, airtightness between each of the end fitment portions $3_1$ of the sleeve and the end plate 3 is held in such a manner that fastening force generated by the fasteners 70 is received by the upper and lower sleeve members 2 and 1 and then transmitted therefrom to the peak-and-valley shaped grooves 26 formed on the outer peripheral surface of the end plate 3. This results in workability in assembling and disassembling of the closure of the illustrated embodiment being highly enhanced without any separate end plate gasket being required.

Figure 8:
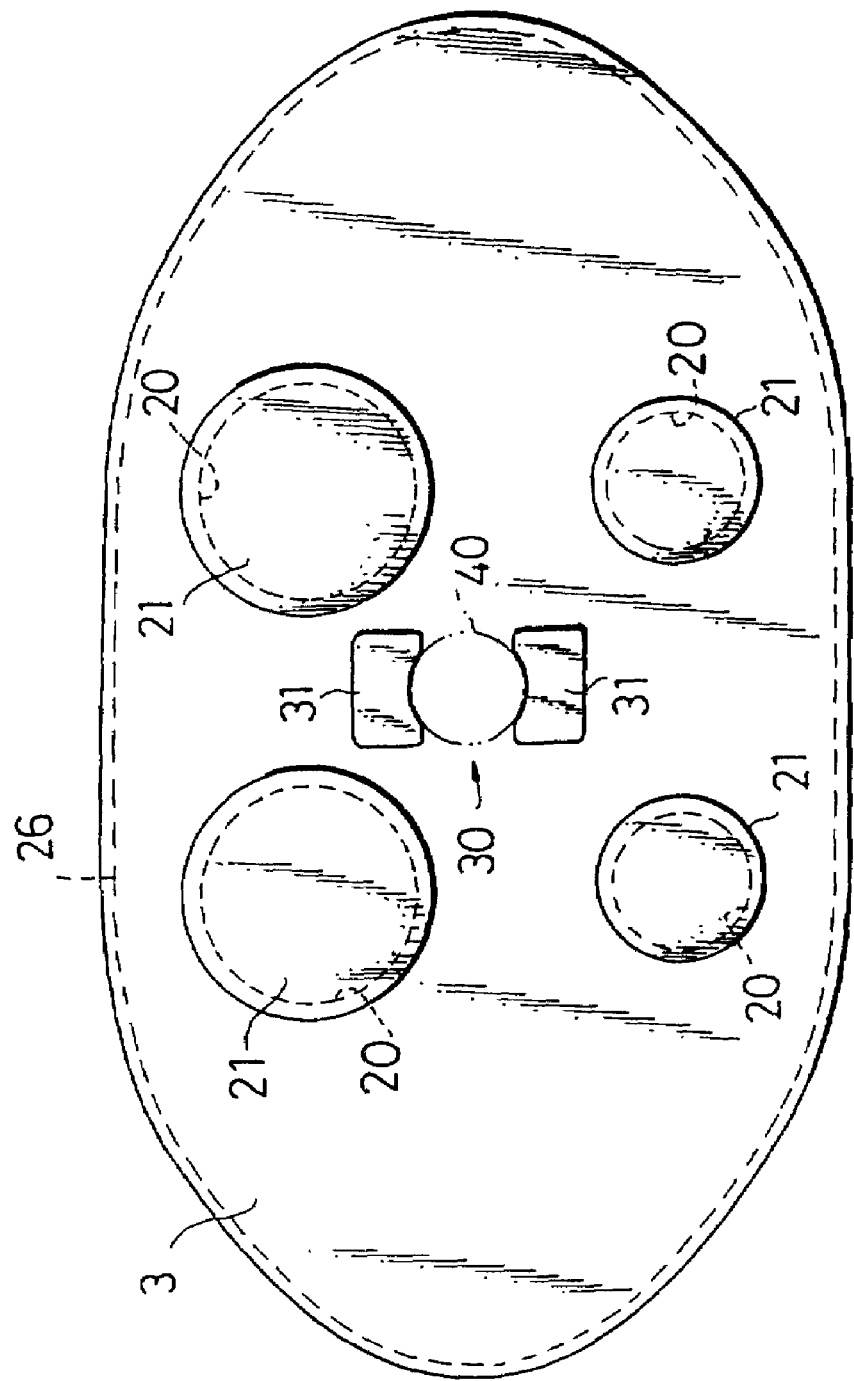
FIG. 8 is a rear view of the end plate shown in FIG. 7.
Figure 9:
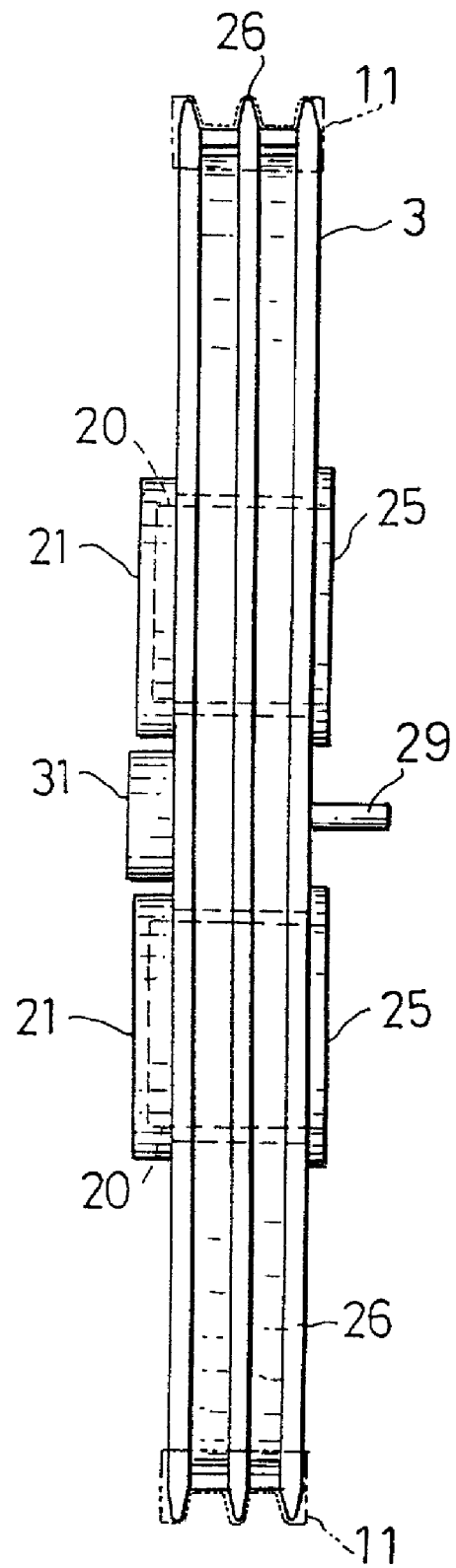
FIG. 9 is a plan view of the end plate shown in FIG. 7.
Figure 10:
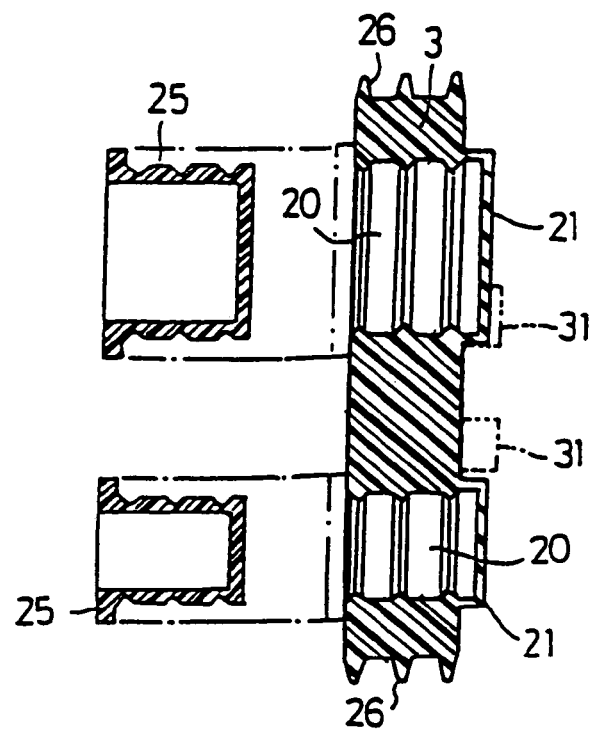
FIG. 10 is a side elevation view in section taken along line 10-10 of FIG. 7.
Figure 11:
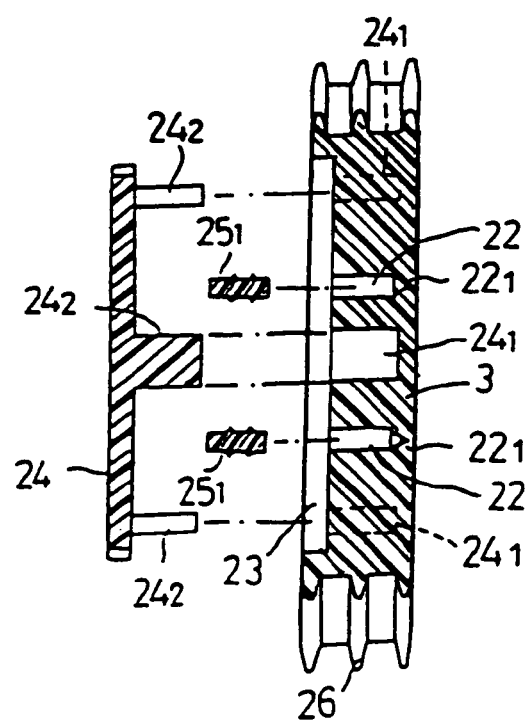
FIG. 11 is a side elevation view in section taken along line 11-11 of FIG. 7.
Figure 12:
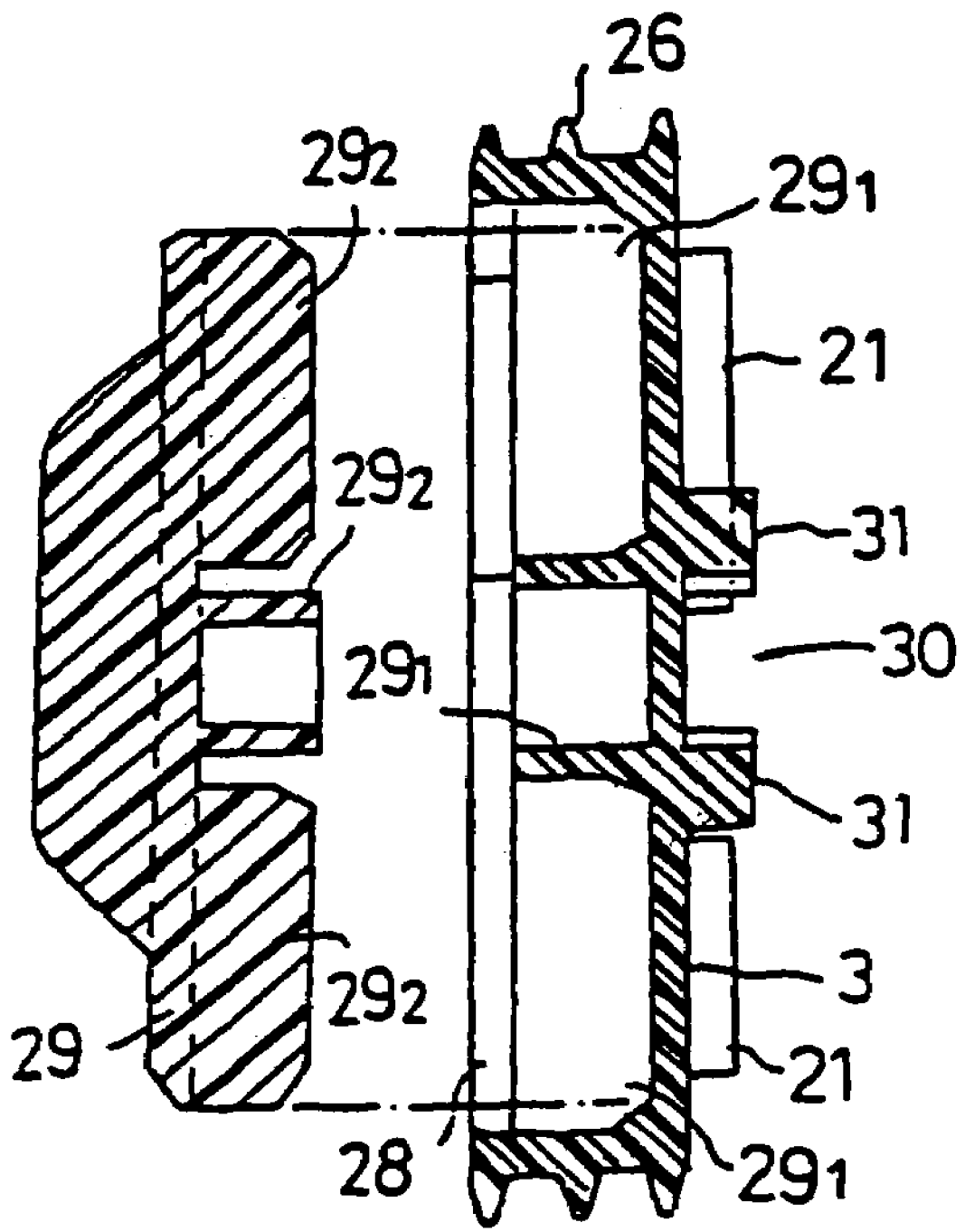
FIG. 12 is a side elevation view in section taken along line 12-12 of FIG. 7.
Figure 14:
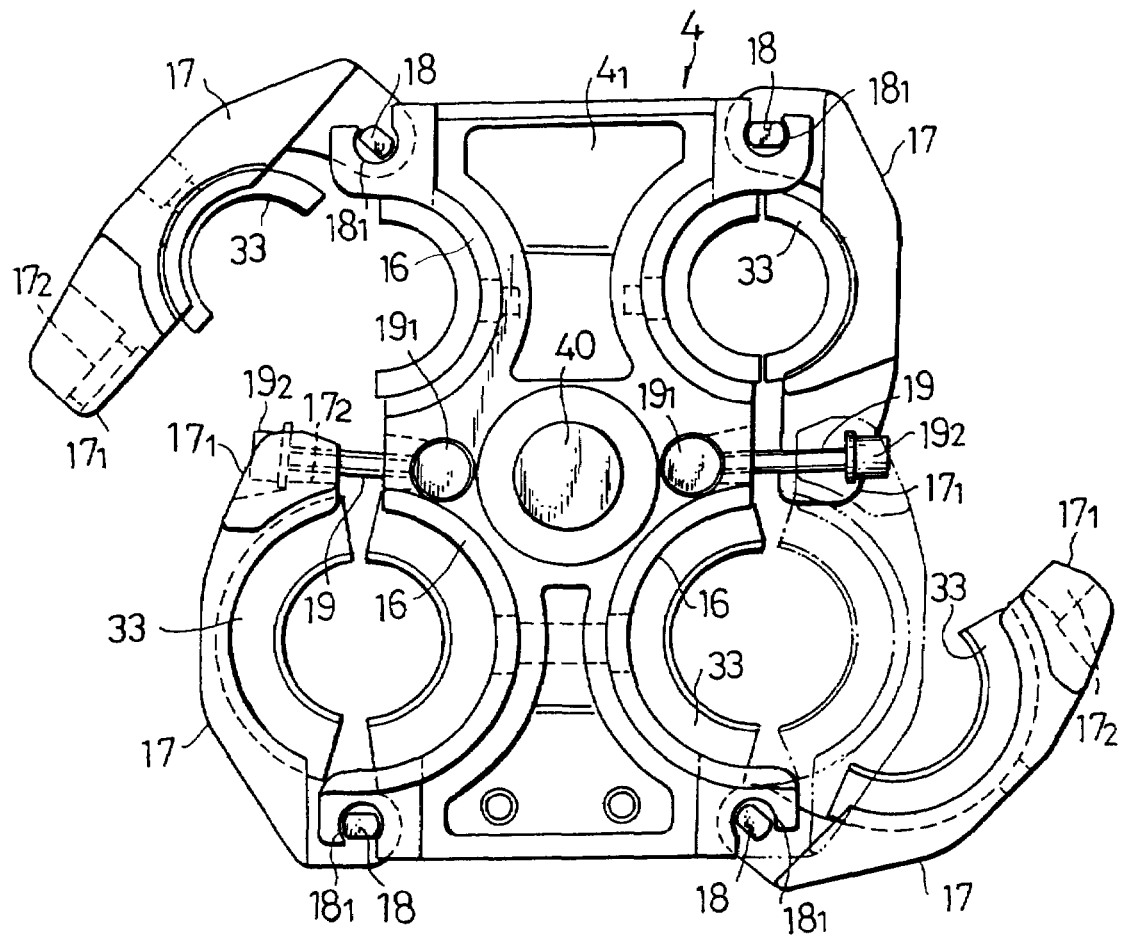
FIG. 14 is a front elevation view showing a cable clamp which may be incorporated in a closure for cable connection according to the present invention.
Figure 15:
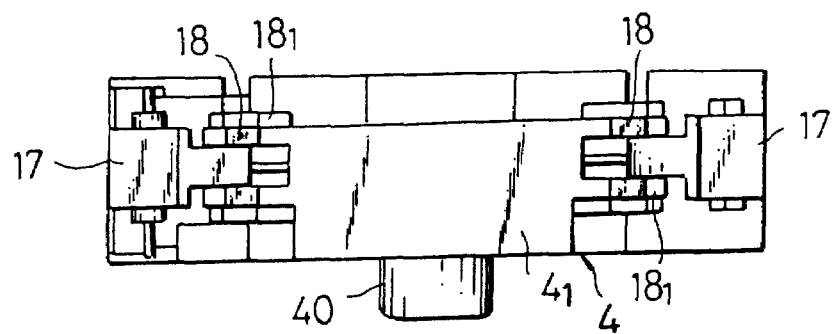
FIG. 15 is a plan view of the cable clamp shown in FIG. 14.
Figure 17A:
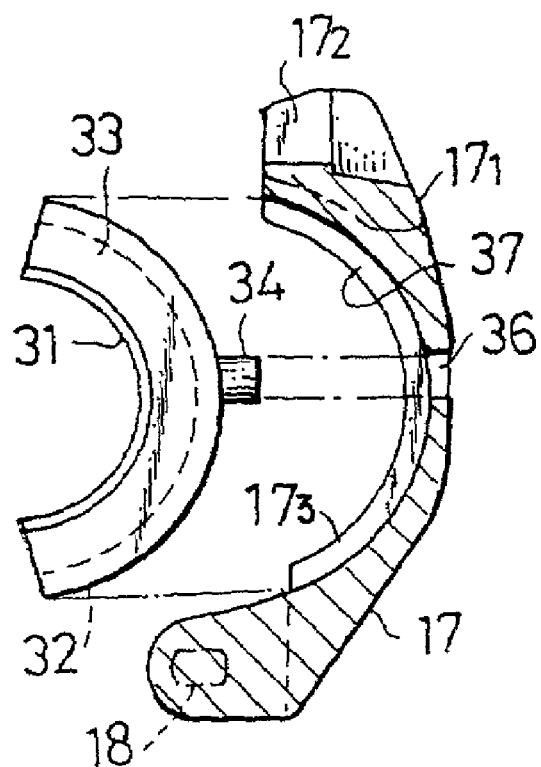
FIG. 17A is an exploded vertical sectional view showing a curved holding member for a cable which may be incorporated in the cable clamp shown in FIG. 14
Figure 17B:
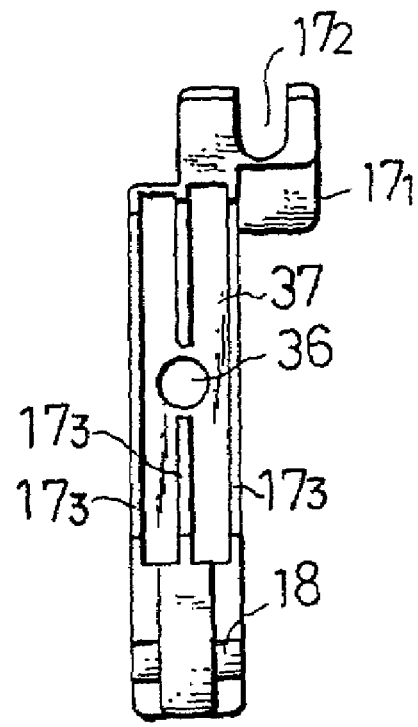
FIG. 17B is a side elevation view of the curved holding member shown in FIG. 17A.
Figure 17C:
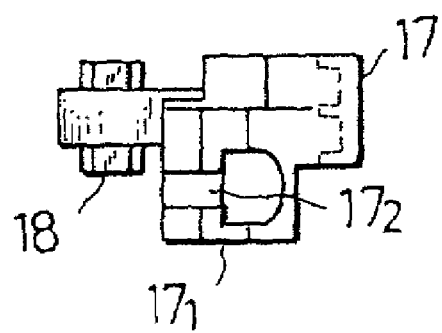
FIG. 17C is a plan view of the curved holding member shown in FIG. 17A.
Figure 18A:
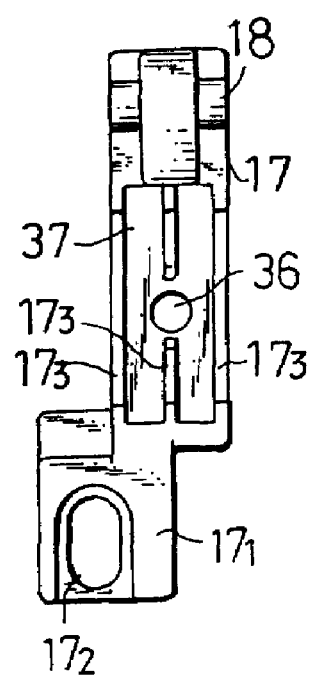
FIG. 18A is a left side elevation view showing a curved holding member for a support wire which may be incorporated in the cable clamp shown in FIG. 14.
Figure 18B:
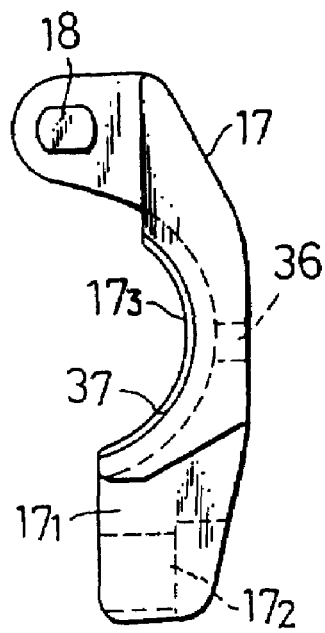
FIG. 18B is a front elevation view of the curved holding member shown in FIG. 18A.
Figure 18C:
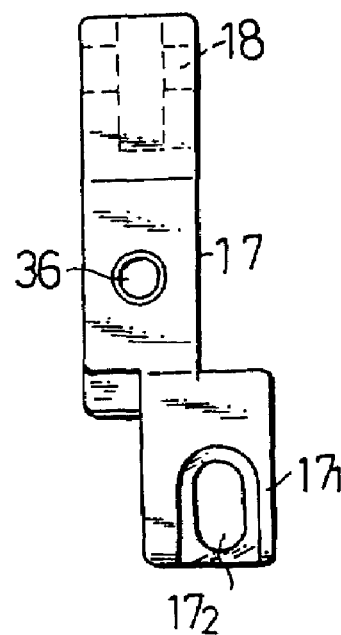
FIG. 18C is a right side elevation view of the curved holding member shown in FIG. 18A.
Figure 18D:
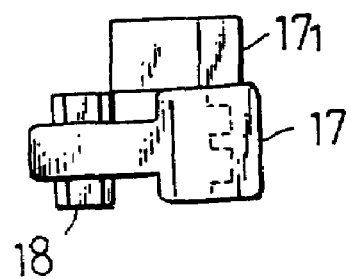
FIG. 18D is a plan view of the curved holding member shown in FIG. 18A.
Figure 19A:
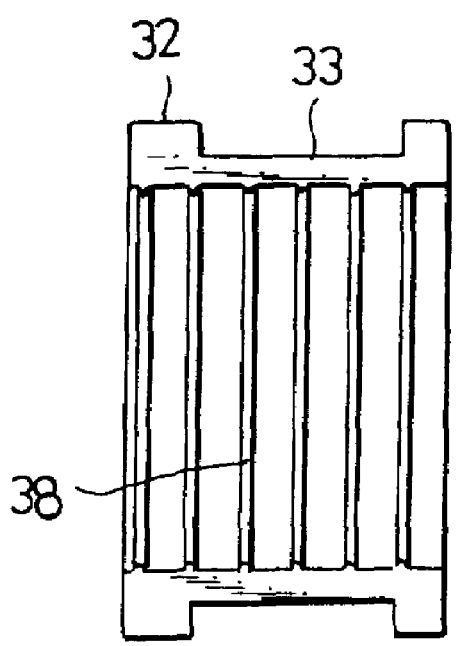
FIG. 19A is a side elevation view showing a holding spacer for the curved holding member of FIG. 17A which is viewed from a split plane side.
Figure 19B:
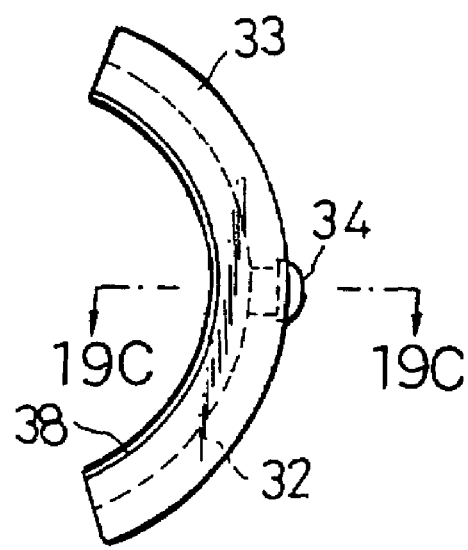
FIG. 19B is a front elevation view of the spacer shown in FIG. 19A.
Figure 19C:
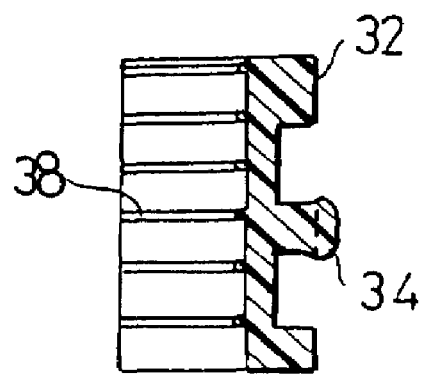
FIG. 19C is a plan view in section taken along line 19C-19C of FIG. 19B.
Figure 20:
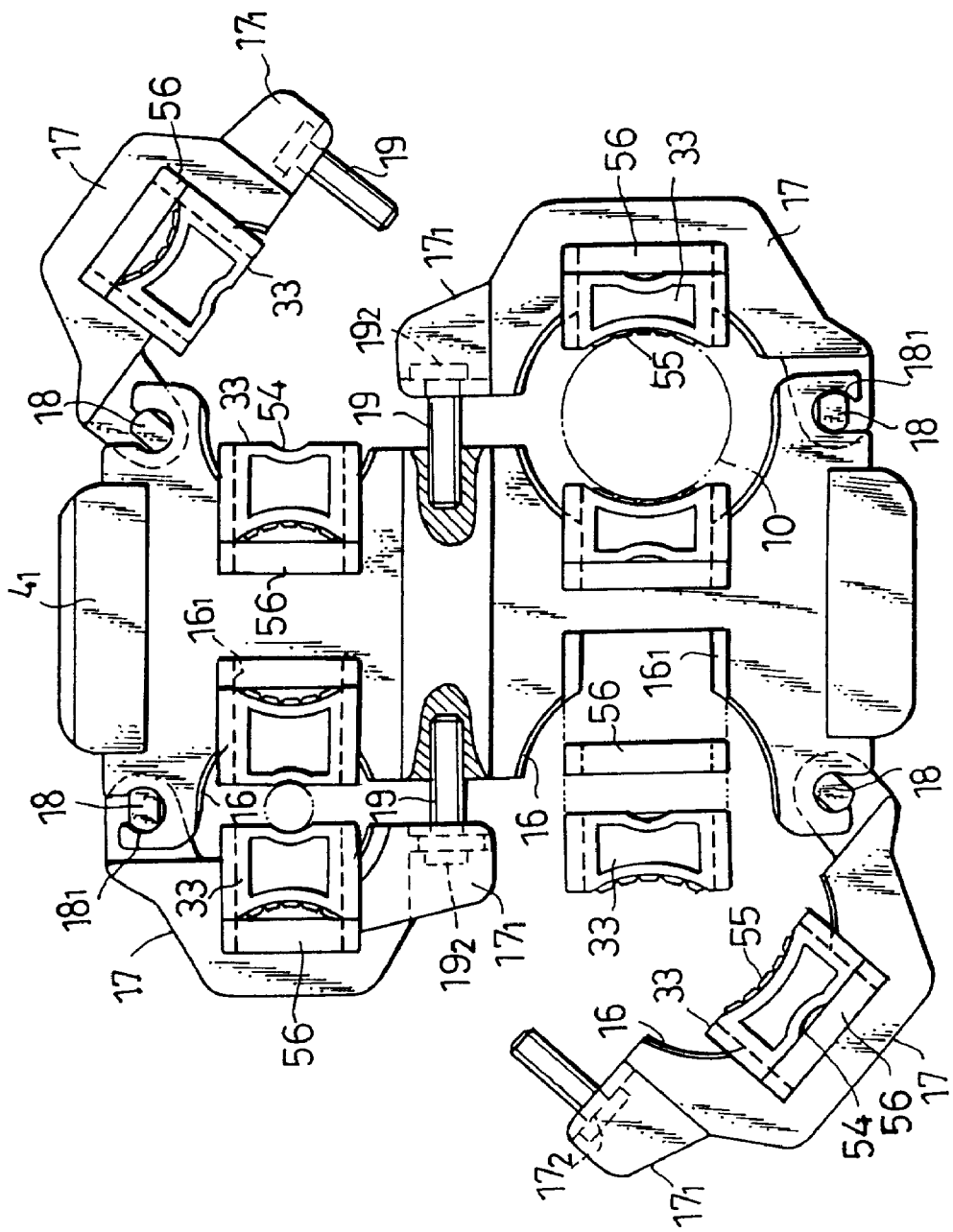
FIG. 20 is a front elevation view showing another example of a cable clamp which may be incorporated in a closure for cable connection according to the present invention.
Figure 21A:
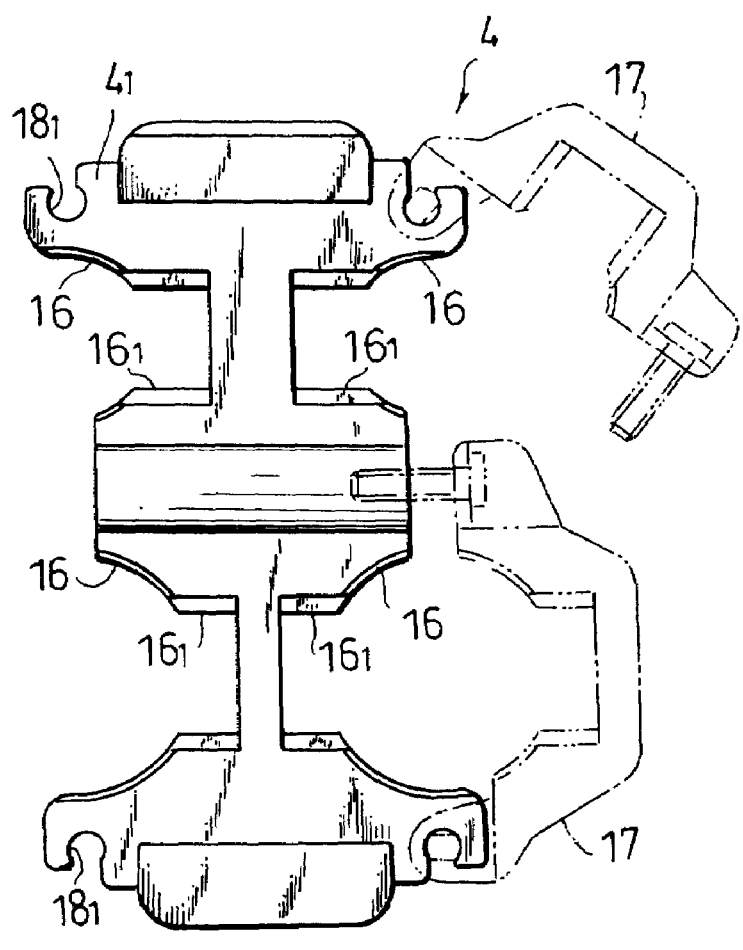
FIG. 21A is a front elevation view showing a clamp body of the cable clamp shown in FIG. 20.
Figure 21B:
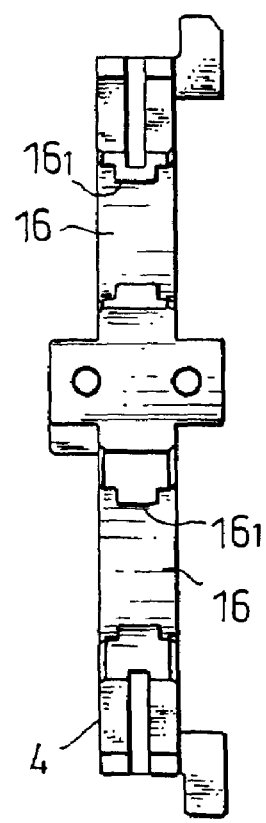
FIG. 21B is a side elevation view of the clamp body.
Figure 21C:
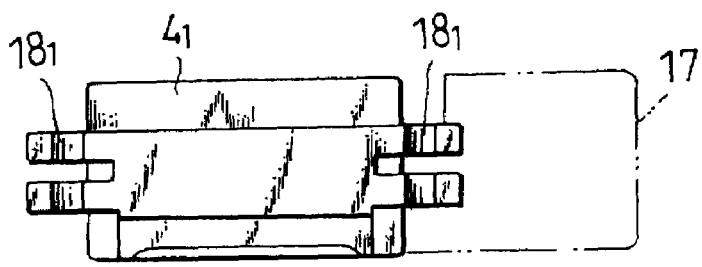
FIG. 21C is a plan view of the clamp body.
Figure 22A:
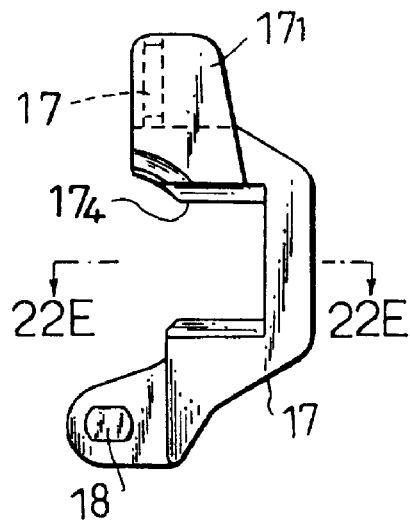
FIG. 22A is a front elevation view showing a curved holding member for a cable or a support wire which may be incorporated in the cable clamp of FIG. 20.
Figure 22B:
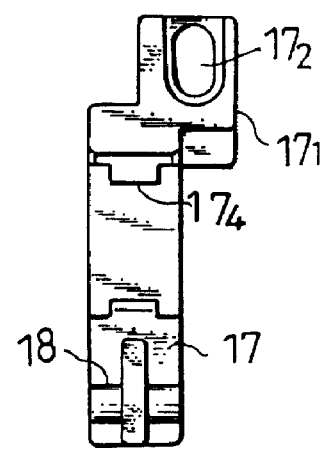
FIG. 22B is a side elevation view of the curved holding member.
Figure 22C:
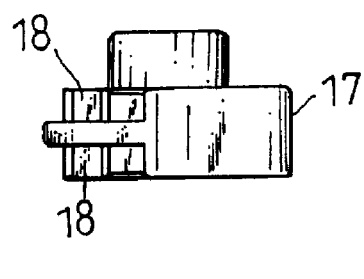
FIG. 22C is a bottom view of the curved holding member.
Figure 22D:
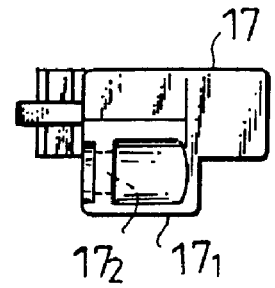
FIG. 22D is a plan view of the curved holding member.
Figure 22E:
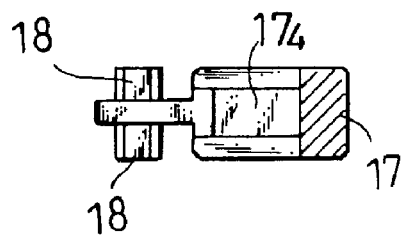
FIG. 22E is a plan view in section take along line 22E-22E of FIG. 22A.
Figure 23A:
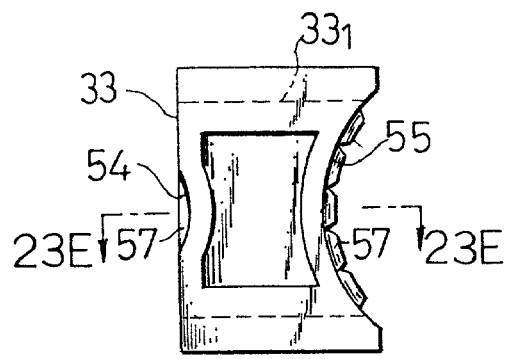
FIG. 23A is a front elevation view showing a holding spacer for a support wire which may be used in the cable clamp of FIG. 20.
Figure 23B:
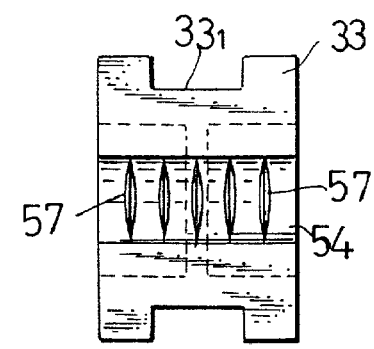
FIGS. 23B and 23C are respectively left side and right side elevation views of the holding spacer.
Figure 23C:
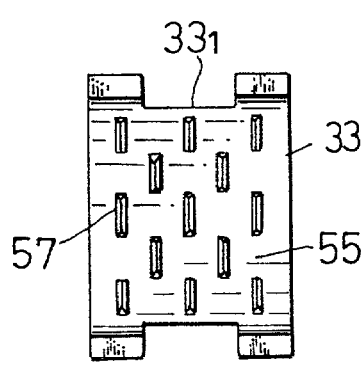
Figure 23D:
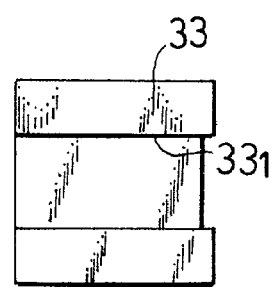
FIG. 23D is a plan view of the holding spacer.
Figure 23E:
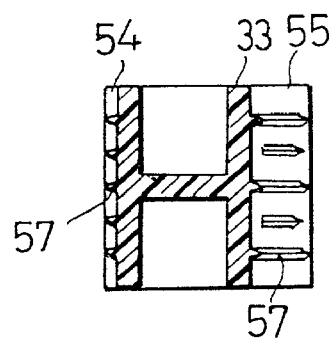
FIG. 23E is a sectional view taken along line 23E-23E of FIG. 23A.
Figure 24A:
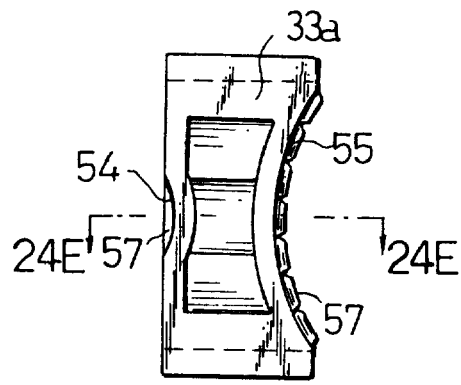
FIG. 24A is a front elevation view showing a first spacer member of a holding spacer for a cable which may be used in the cable clamp of FIG. 20.
Figure 24B:
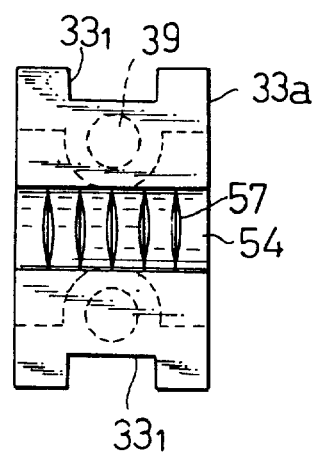
FIGS. 24B and 24C are respectively left side and right side elevation views of the first spacer member.
Figure 24C:
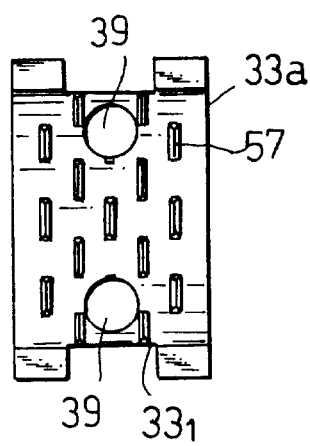
Figure 24D:
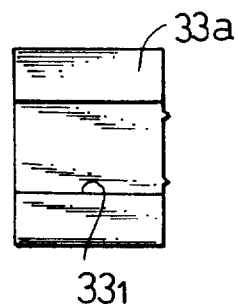
FIG. 24D is a plan view of the first spacer member.
Figure 24E:
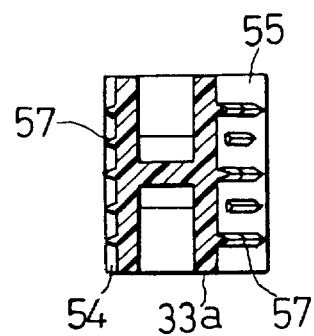
FIG. 24E is a sectional view taken along line 24E-24E of FIG. 24A.
Figure 25A:
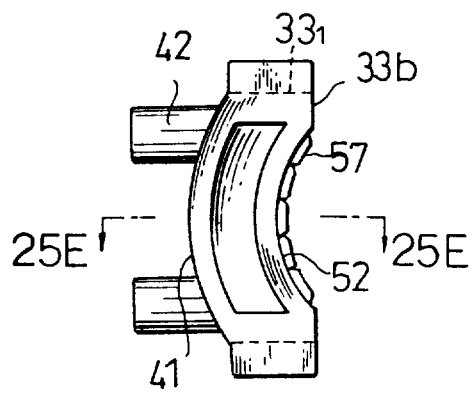
FIG. 25A is a front elevation view showing a second spacer member of the holding spacer for a cable which may be used in combination with the first spacer member shown in FIG. 24A.
Figure 25B:
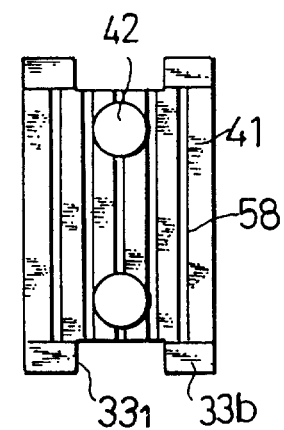
FIGS. 25B and 25C are respectively left side and right side elevation views of the second spacer member.
Figure 25C:
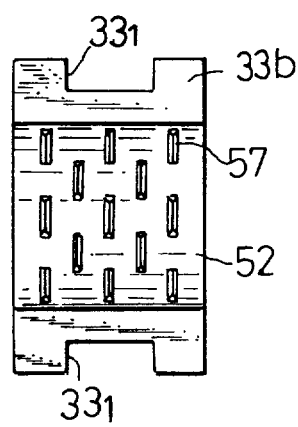
Figure 25D:
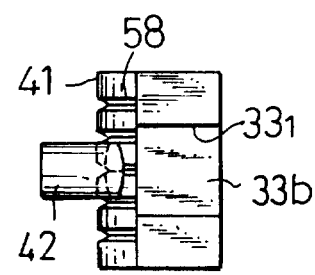
FIG. 25D is a plan view of the second spacer member.
Figure 25E:
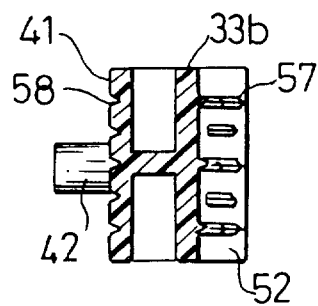
FIG. 25E is a sectional view taken along line 25E-25E of FIG. 25A.
Figure 27:
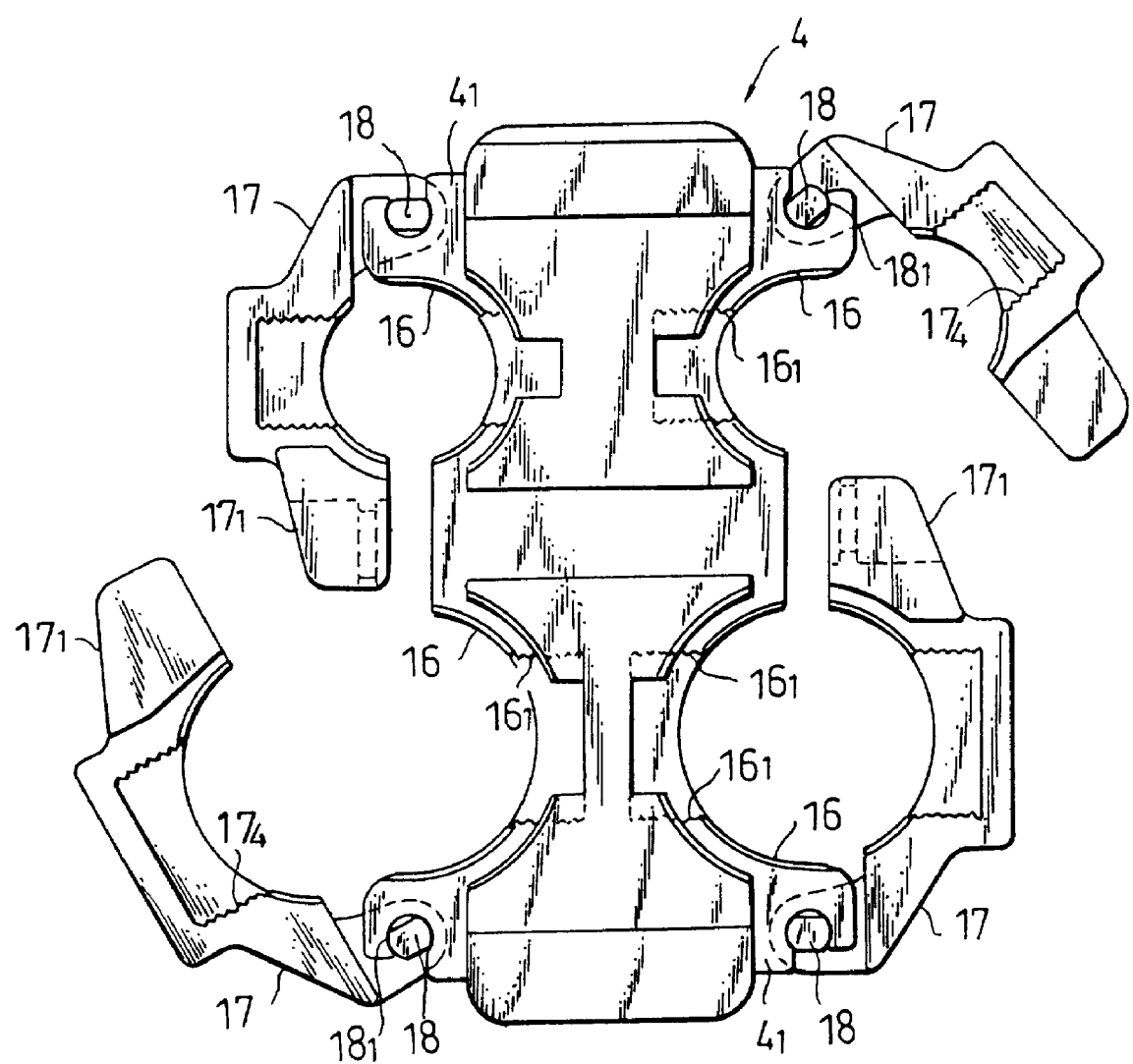
FIG. 27 is a front elevation view showing a further example of a cable clamp which may be incorporated in a closure for cable connection according to the present invention.
Figure 28A:
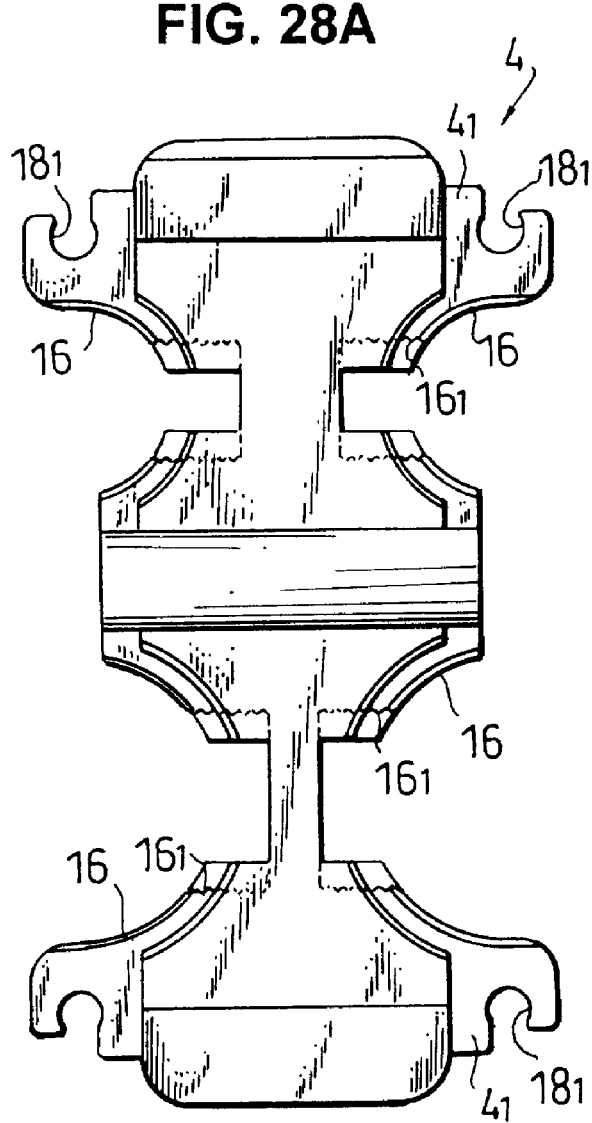
FIG. 28A is a front elevation view showing a clamp body of the cable clamp shown in FIG. 27.
Figure 28B:
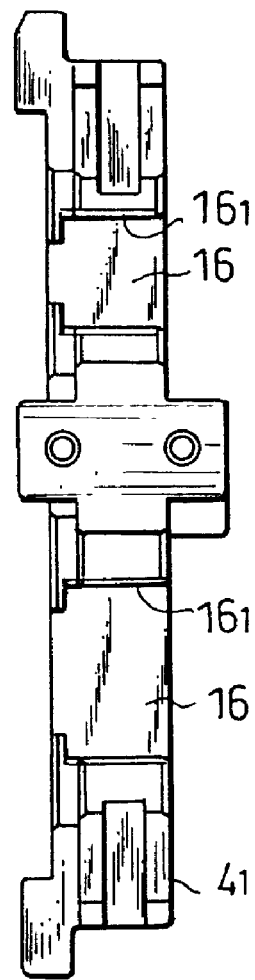
FIG. 28B is a side elevation view of the clamp body.
Figure 28C:
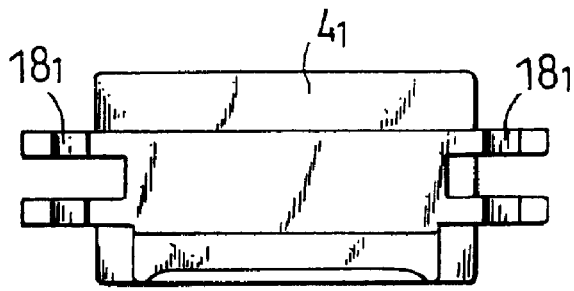
FIG. 28C is a plan view of the clamp body.
Figure 29A:
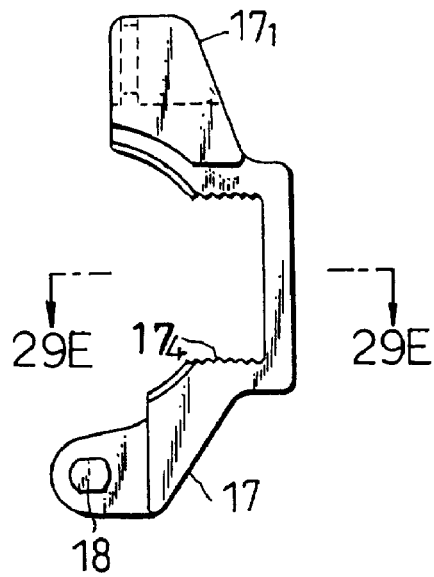
FIG. 29A is a front elevation view showing a curved holding member for a cable which may be incorporated in the cable clamp of FIG. 27.
Figure 29B:
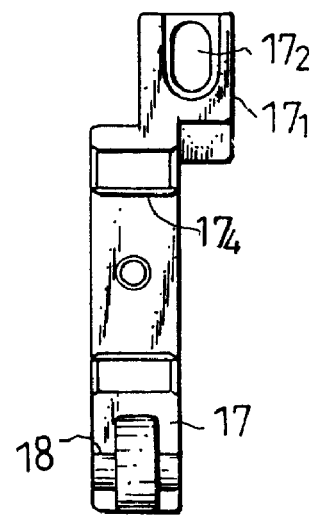
FIG. 29B is a side elevation view of the curved holding member.
Figure 29C:
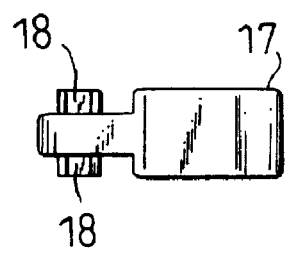
FIG. 29C is a bottom view of the curved holding member.
Figure 29D:
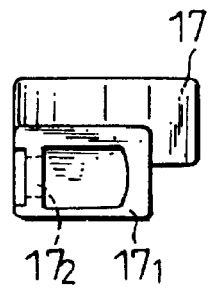
FIG. 29D is a plan view of the curved holding member.
Figure 29E:
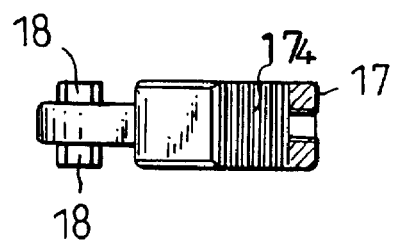
FIG. 29E is a plan view in section take along line 29E-29E of FIG. 29A.
Figure 30A:
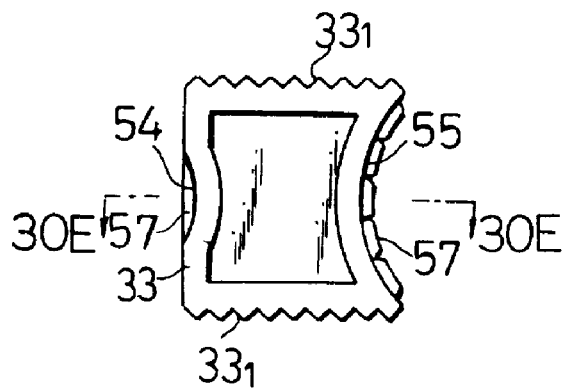
FIG. 30A is a front elevation view showing a holding spacer for a support wire which may be used in the cable clamp of FIG. 27.
Figure 30B:
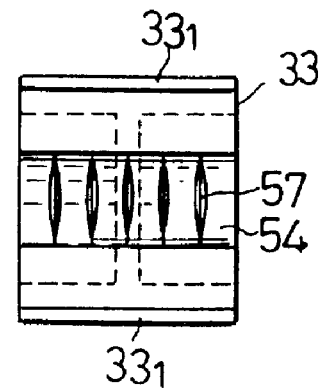
FIGS. 30B and 30C are respectively left side and right side elevation views of the holding spacer.
Figure 30C:
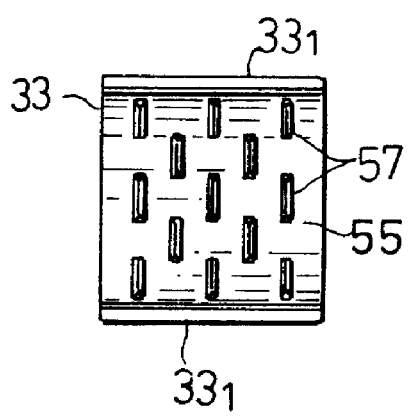
Figure 30D:
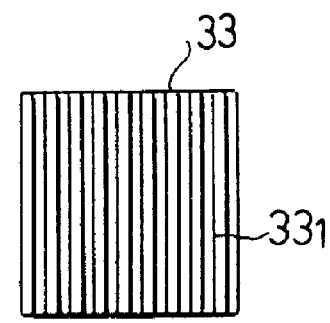
FIG. 30D is a plan view of the holding spacer.
Figure 30E:
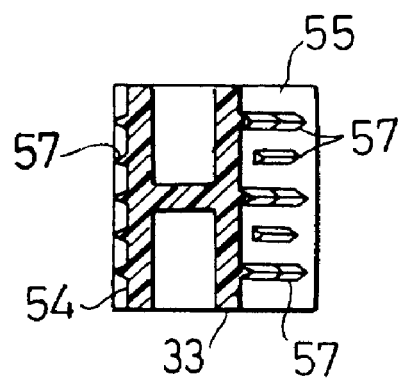
FIG. 30E is a sectional view taken along line 30E-30E of FIG. 30A.
Figure 31A:
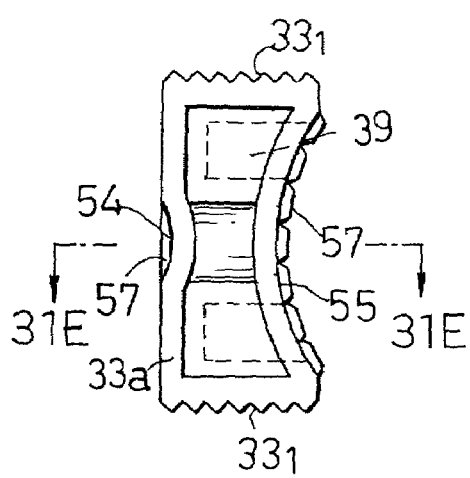
FIG. 31A is a front elevation view showing a first spacer member of a holding spacer for a cable which may be used in the cable clamp of FIG. 27.
Figure 31B:
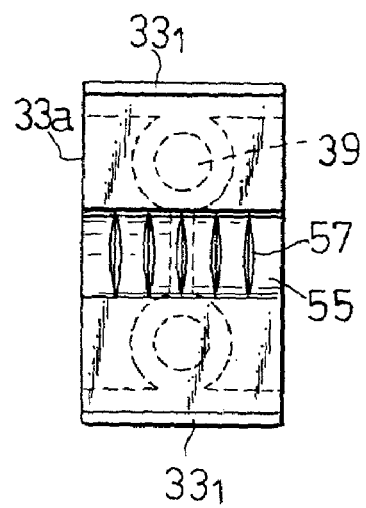
FIGS. 31B and 31C are respectively left side and right side elevation views of the first spacer member.
Figure 31C:
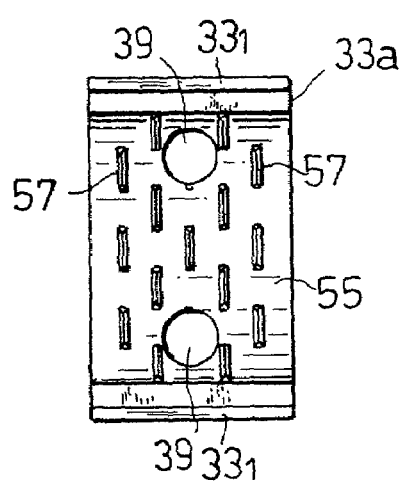
Figure 31D:
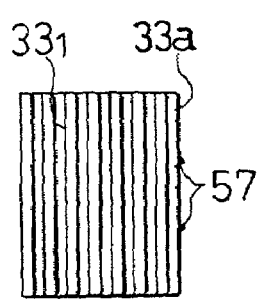
FIG. 31D is a plan view of the first spacer member.
Figure 31E:
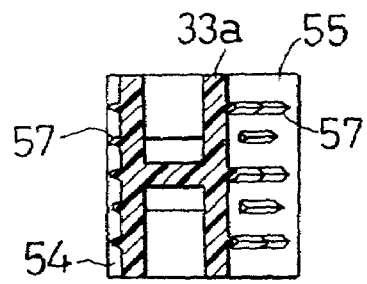
FIG. 31E is a sectional view taken along line 31E-31E of FIG. 31A.
Figure 32A:
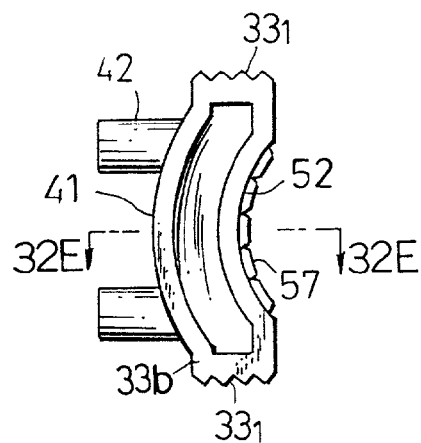
FIG. 32A is a front elevation view showing a second spacer member of the holding spacer for a cable which may be used in combination with the first spacer member shown in FIG. 31A.
Figure 32B:
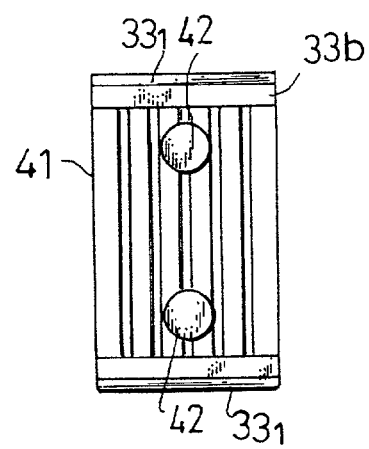
FIGS. 32B and 32C are respectively left side and right side elevation views of the second spacer member.
Figure 32C:
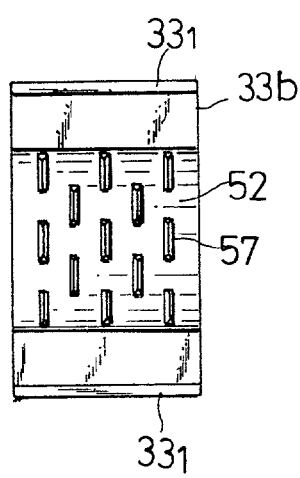
Figure 32D:
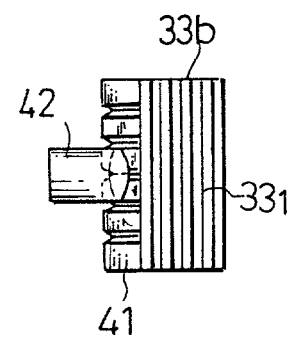
FIG. 32D is a plan view of the second spacer member.
Figure 32E:
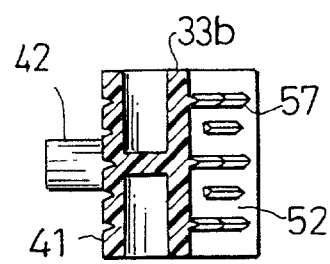
FIG. 32E is a sectional view taken along line 32E-32E of FIG. 32A.

The end plate 3 is provided on the inner surface thereof with a holder 31 in order to accomplish securer arrangement of the end plate 3 and prevent deformation of the end plate 3 due to application of any external force thereto. For this purpose, the holder 31 is formed with a recess 30 in which a projection 40 provided on the cable clamp 4 is fitted, as shown in FIG. 8.

Also, the end plate 3 is constructed so as to be accommodated to cables of different diameters. To this end, a spacer 43 made of a rubber or resin material is used for adjusting a diameter of the cable guide hole 20 of the end plate 3 depending on a diameter of a cable to be inserted therethrough. Alternatively, an airtight tape may be used for this purpose. The spacer 43 or airtight tape is wound on the cable 10, resulting in ensuring intimate contact of an outer peripheral surface of the cable 10 with an inner peripheral surface of the through hole formed from the cable guide hole 20.

The spacer 43 arranged on the periphery of the cable led out of the sleeve, as shown in FIGS. 13A to 13C, is formed with a hollow cylindrical shape and provided on one side thereof with a slit 44 for cable insertion, resulting in the spacer 43 being permitted to open on the one side thereof. Also, the spacer 43 is provided on inner and outer surface thereof with annular grooves 46 and 45 of a peak-and-valley shape, respectively, to thereby ensure satisfactory airtightness of the spacer 43 and facilitate assembling and disassembling of the spacer 43 with respect to the cable 10.

The spacer 43 is placed in a natural environment, therefore, it is constructed of a rubber material or the like which is shrinkable or expandable depending on an environmental temperature, to thereby minimize a variation in pressure between the outer periphery of the end plate 3 and the sleeve and between an inner periphery of the cable guide hole and an outer periphery of the cable, resulting in providing satisfactory compression force and preventing shrinkage due to a decrease in temperature. In order to ensure that the cable guide hole 20 of the end plate 3 permits cables 10 of different diameters to be selectively inserted therethrough without changing a diameter of the cable guide hole 20, a plurality of spacers 43 may be prepared by forming an outer diameter thereof the same as a diameter of the cable guide hole 20 and inner diameters thereof in correspondence to respective outer diameters of the cables.

In using an airtight tape for sealing between the cable guide hole 20 and the outer periphery of the cable 10, the airtight tape may be made of a rubber material of a low hardness which has a Shore hardness (Hs) of 0 to 30 and which exhibits a large elongation and a large tensile stress or modulus. Such a rubber material may be made of a thermoplastic rubber composition, such as an EPDM material, a silicone rubber material, a butyl rubber material, a styrene-butadiene rubber material, a fluororubber material or the like, which exhibits a penetration of 40 to 90, preferably 50 to 70 ($10^{-1}$ mm, as measured according to the Japanese Industrial Standard (JIS) K 2560), an elongation of 1500 to 2000 percent, preferably 1700 to 1900 percent (JIS K 6301), and tensile stresses of 100%-0.5 kgf/cm², 300%-1.0 kgf/cm² and 400%-1.4 kgf/cm² (JIS K 6301). More particularly, the rubber material may have a specific gravity of 1.0 to 1.05, a tensile strength of 31.0 kgf/cm² and a compression set of 63.0% (70° C.×22 hrs.). The airtight tape made of such a rubber material of low hardness can be elastically deformed in conformity with the outer peripheral surface of a cable jacket or a support wire which has linear protrusions or irregularities formed thereon so that the airtight tape can be brought into intimate contact with the outer peripheral surface without any gap, resulting in satisfactory sealing being provided.

The cable clamp 4, as shown in FIGS. 14 to 19C, includes a clamp body $4_1$ formed with a plurality of cable guide recesses 16 and the curved holding members 17 are each detachably and pivotally mounted on the clamp body $4_1$ by means of a pin 18 in a manner to be opposite to a corresponding one of the recesses 16. The curved holding members 17 are each formed with a shape which permits it to surround the outer periphery of the cable 10 in cooperation with a corresponding one of the recesses 16. The curved holding member 17 is then secured or fastened to the clamp body $4_1$ of the cable clamp 4 by means of a screw 19 acting as a fastening member to hold the cable in a manner to interpose it between the clamp body $4_1$ and the curved holding member 17. Thus, it will be noted that the cable clamp 4 facilitates clamping of the cable. More particularly, the curved holding member 17 which is arranged opposite to a corresponding one of the cable guide recesses 16 is constructed into an arm-like member which is provided at one end thereof with the pin 18 for enabling pivotal movement of the member 17 and at the other end or free end 17₁ thereof with a screw insertion hole 17₂ through which the screw 19 is inserted. The pin 18 is provided with two surfaces parallel to each other and detachably fitted in a release prevention mechanism provided at the clamp body 4₁, resulting in the pin 18 being pivotally supported on the clamp body 4₁ of the cable clamp 4. In the illustrated embodiment, the release prevention mechanism is provided by holding recesses 18₁ each formed with a narrow opening which permits the two parallel surfaces of the pin 18 to be inserted therethrough into the holding recess 18₁. The fastening member or screw 19 for fastening each of the curved holding members 17 is threadedly fitted in a pivotal element 19₁ pivotally supported on the clamp body 4₁ of the cable clamp 4 and has a head 19₂ thereof held on the free end 17₁ of the curved holding member 17.

Also, the cable guide recess 16 and curved holding member 17 are provided on an inner surface thereof with a plurality of annular projections 18₂ and 17₃, respectively, resulting in recesses 37 being provided, in which recesses 37 holding spacers 33 adapted to be pressedly abutted against a jacket of a cable are detachably fitted. The holding spacers 33 are each constructed of an arcuate element which is formed on an arcuate inner peripheral surface thereof with grooves 38 of a peak-and-valley shape and on an outer peripheral surface thereof with a flange 32. The holding spacer 33 is provided on the outer peripheral surface thereof with a projection 34. The holding spacers 33 are each detachably fitted in the recess 37 of the cable guide recess 16 or that of the curved holding member 17 while the projection 34 is fitted in a hole 36 formed in the cable guide recess 16 or curved holding member 17.

With reference to FIGS. 20 to 29, another example of a cable clamp 4 will be described below. In this illustrated example, the cable clamp 4 includes a clamp body 4₁ formed with cable guide recesses 16 and curved holding members 17. The cable guide recesses 16 and curved holding members 17 are provided with mating or fitting surfaces 16₁ and 17₄, respectively, on which respective mating surfaces 33₁ formed on holding spacers 33 are slidably fitted, resulting in the holding spacers 33 in pairs being detachably mounted in the cable guide recesses 16 and curved holding members 17 so as to face each other. The curved holding members 17 are each fastened to the clamp body 4₁ of the cable clamp 4 through a screw 19.

The holding spacers 33, as shown in FIGS. 23A to 23E, are each formed on opposite ends thereof with a pair of arcuate concave surfaces 54 and 55 of different curvatures which are adaptable to outer peripheries of cables having different diameters and which are curved in opposite directions. The arcuate concave surfaces 54 and 55 of the holding spacer 33 are each provided thereon with a plurality of ribs 57 which are projectedly arranged at intervals and which extend in a direction perpendicular to an axis of the cable. Each of the holding spacers 33 thus constructed is mounted on the clamp body 4₁ or one of the curved holding members 17 while a distance piece 56 of a suitable thickness is, as required, interposed between the holding spacer 33 and the clamp body 4₁ or curved holding member 17.

Alternatively, as shown in FIGS. 24, 25 and 26A to 26F, holding spacers 33 may each be constructed of a first spacer member 33a and a second spacer member 33b which are detachably joined together through at least one arcuate surface formed thereon in correspondence to an outer periphery of a cable. In this instance, the first spacer member 33a is provided at one end thereof with an arcuate concave surface 54 of a small radius and provided at the other end thereof with an arcuate concave surface 55 of a large radius which is curved in an opposite direction and which is formed therein with a pair of fitting holes 39. The arcuate concave surfaces 54 and 55 of the first spacer member 33a are provided thereon with a plurality of ribs 57 projected therefrom. The second spacer member 33b is provided at one end thereof with an arcuate convex surface 41 which conforms with the arcuate concave surface 55 of the first spacer member 33a and which is provided thereon with a pair of connection rods 42 adapted to be fitted in the respective fitting holes 39 of the first spacer member 33a. The second spacer member 33b is also provided at the other end thereof with an arcuate concave surface 52 of an intermediate radius. The arcuate convex surface 41 is formed thereon with a plurality of grooves 58 into which the ribs 57 of the first spacer member 33a are fitted. Such a construction of the holding spacer which comprises a plurality of spacer members 33a and 33b can be widely applied to various cables of different diameters.

As described above, the holding spacer 33 formed on both ends thereof with the arcuate surfaces 54 and 55 in correspondence to the outer peripheries of the cables permits each of the arcuate surfaces to be used for a cable of a large diameter or that of a small diameter with a suitable distance piece 56 being selectively interposed. Furthermore, in the cable guide recess 16 of a large radius, the hoding spacer 33 including the first and second spacer members 33a and 33b which are detachably joined together through the arcuate surfaces 41 and 55 thereof may be selectively used, the first spacer member 33a is mounted in the cable guide recess 16 alone or in combination with the second spacer member 33b depending on a diameter of the cable, as shown in FIGS. 26A to 26I. As a result, such a holding spacer can widen the range of applicability thereof to cables of various diameters.

The fitting or mating surfaces 16₁, 17₄ and 33₁ may be formed to have a plurality of linear protrusions which extend in parallel with an axis of the cable, or alternatively, to have triangular-shaped teeth, corrugations or serrated protrusions, so that mounting or replacement of the holding spacers 33 or spacer members 33a and 33b can be readily carried out. The fitting surfaces 16₁, 17₄ and 33₁ thus constructed facilitate adjustment of a position of each of the holding spacers 33 in a radial direction with respect to the cable and can eliminate a distance piece 56 unlike the aforementioned embodiments.

Figure 33A:
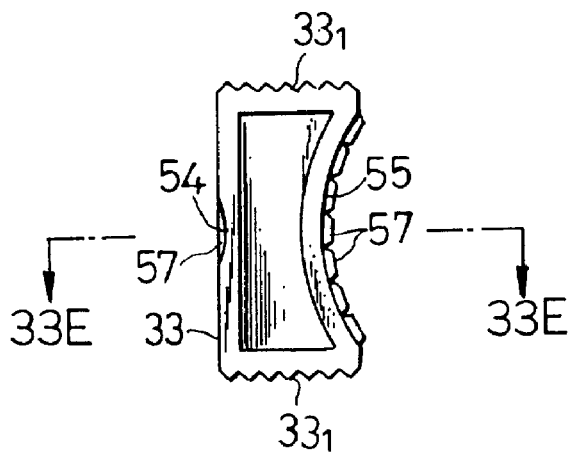
FIG. 33A is a front elevation view showing another example of a holding spacer.
Figure 33B:
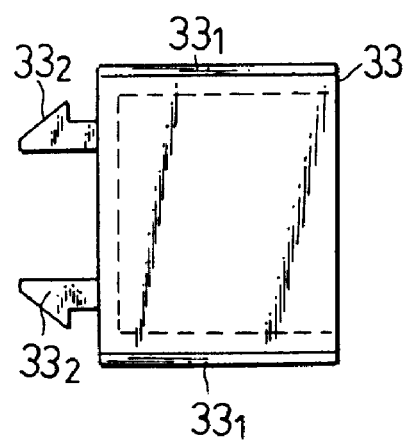
FIGS. 33B and 33C are respectively left side and right side elevation views of the holding spacer.
Figure 33C:
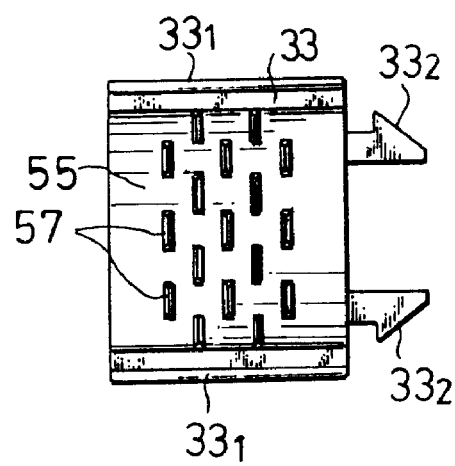
Figure 33D:
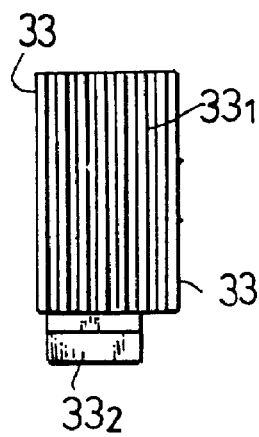
FIG. 33D is a plan view of the holding spacer.
Figure 33E:
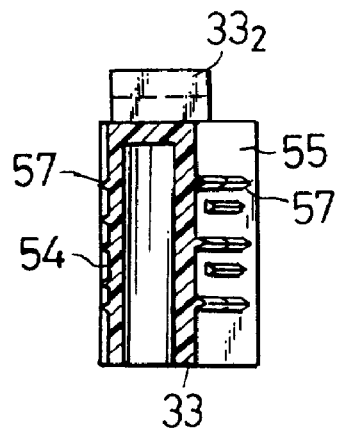
FIG. 33E is a sectional view taken along line 33E-33E of FIG. 33A.
Figure 34:
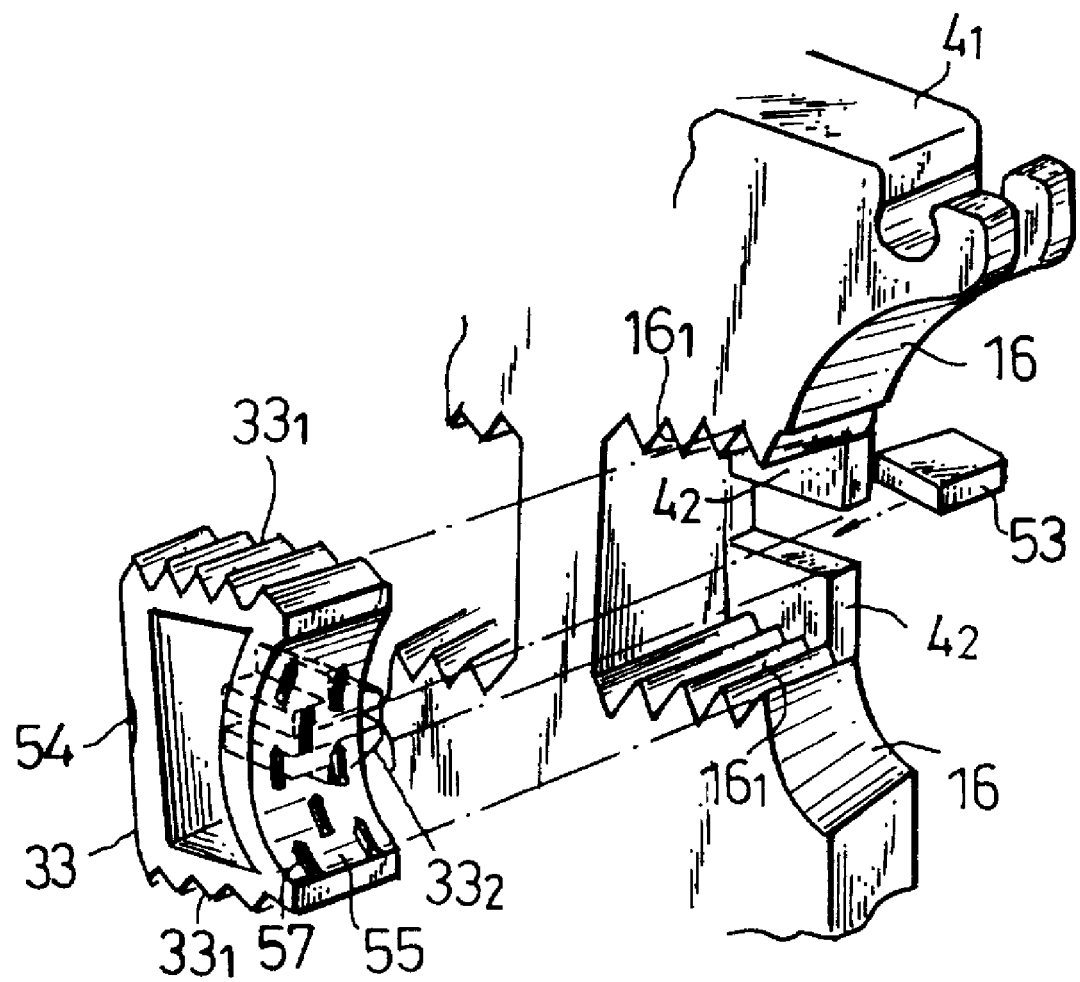
FIG. 34 is a partial exploded perspective view showing arrangement of the holding spacer shown in FIG. 33A.
Figure 35A:
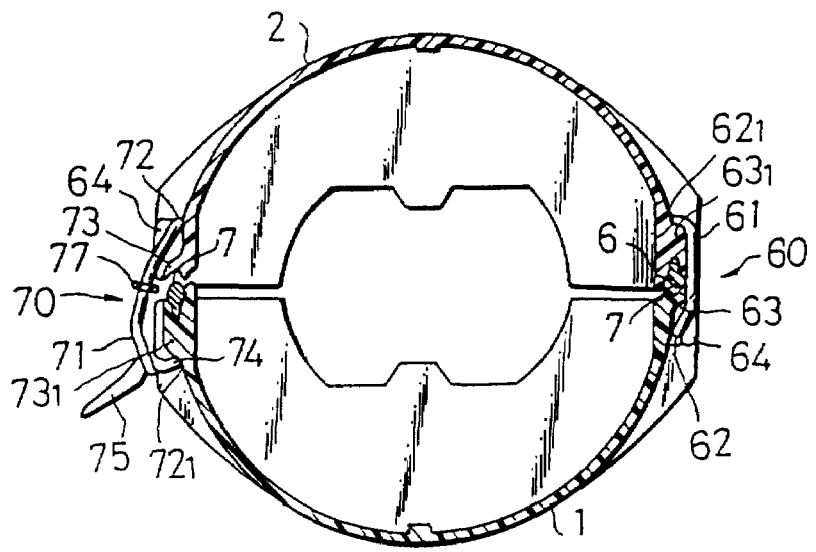
FIG. 35A is a sectional view showing a sleeve of the closure of FIG. 1 which is kept closed.
Figure 35B:
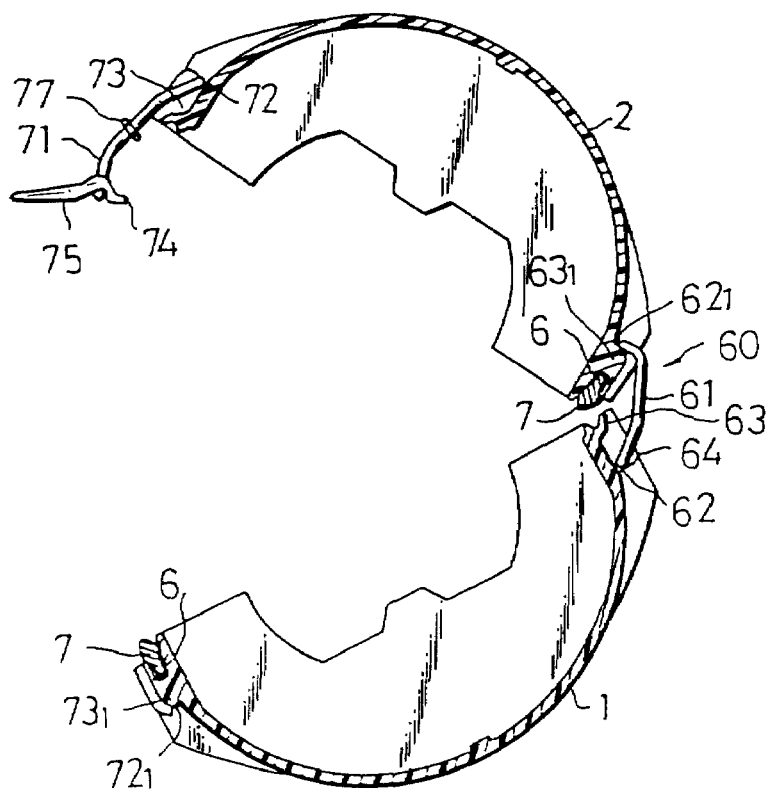
FIG. 35B is a sectional view of the sleeve shown in FIG. 35A which is rendered open.

As shown in FIGS. 33A to 34, the clamp body 4₁ of the cable clamp 4 may be provided at one end of each fitting surface 16₁, into which the holding spacer 33 is slidably fitted, with a pair of loosening prevention pieces 4₂ so as to form a gap therebetween. The holding spacer 33 is projectedly formed at one end thereof with a pair of engagement pawls 33₂. The pawls 33₂ are inserted through the gap between the loosening prevention pieces 4₂ and then a stopper 53 is fitted into between the pawls 33₂ so as to fix the pawls 33₂ to the loosening prevention pieces 4₂, resulting in the holding spacer 33 being prevented from coming out.

Now, the hinges 60 and fasteners 70 will be more detailedly described with reference to FIGS. 35A to 40B.

One of the sleeve members 1 and 2 or the lower sleeve member 1 is formed at a portion thereof in proximity to one of the side edges thereof with a plurality of ring receiving projections 63 in a manner to be spaced from each other in a longitudinal direction thereof. In each of the ring receiving projections 63, a hinge member comprising the loop-like ring 61 is pivotally arranged. Also, the lower sleeve member 1 is provided at a portion thereof in proximity to the other side edge thereof with a plurality of fastener receiving projections $73_1$ in a manner to be spaced from each other in the longitudinal direction thereof. Further, the other or upper sleeve member 2 is provided at a portion thereof in proximity to one of the side edges thereof with a plurality of holding projections $63_1$ in a manner to be spaced from each other in correspondence to the hinge members 61 and at a portion thereof in proximity to the other side edge thereof with a plurality of ring receiving projections 73 in correspondence to the fastener receiving projections $73_1$. The loop-like rings 71 are each pivotally movably arranged in a corresponding one of the ring receiving projections 73. The loop-like ring 71 is pivotally mounted thereon with an operation lever 75 provided at a distal end thereof with a holding projection 74.

Figure 36:
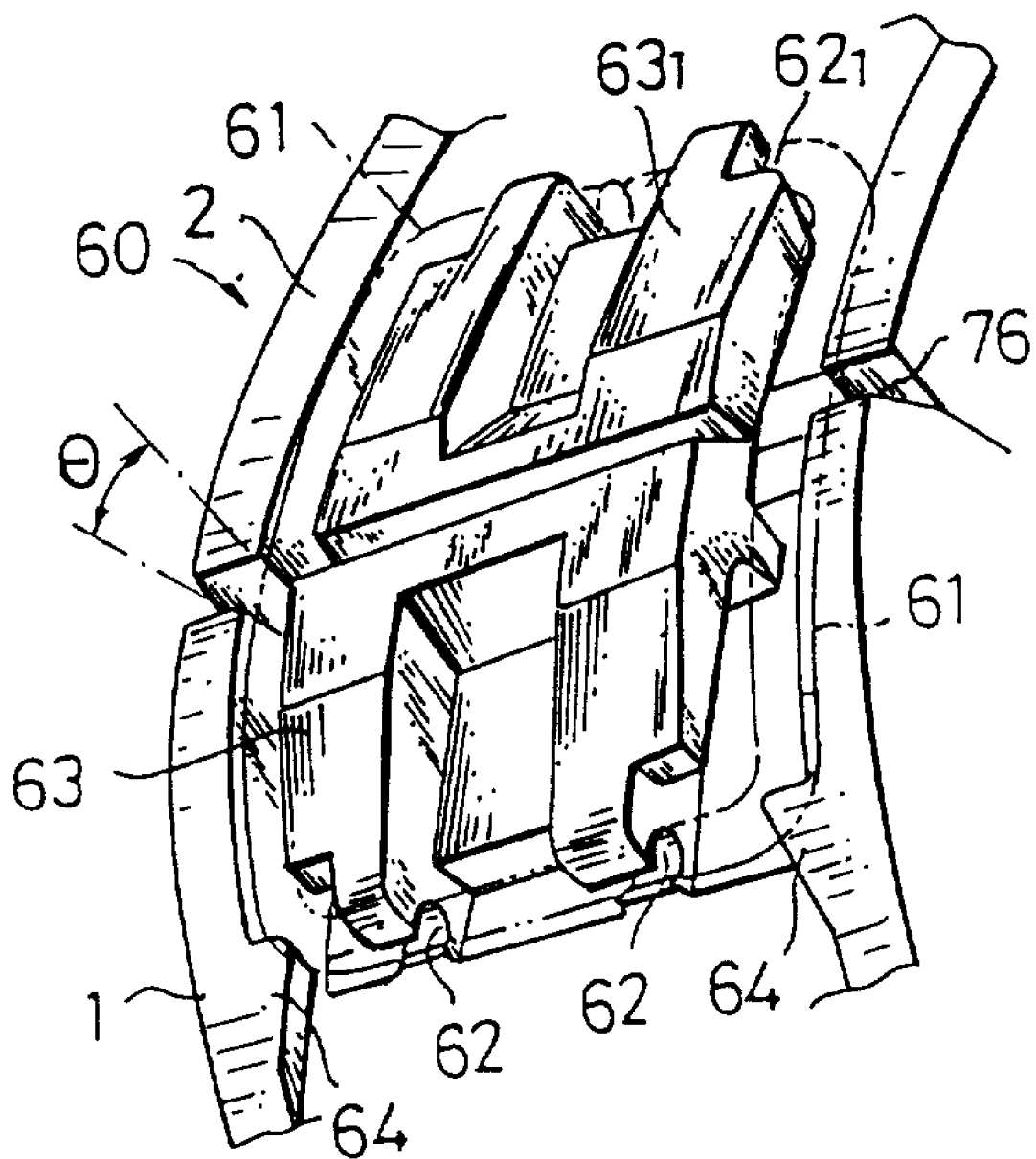
FIG. 36 is an enlarged perspective view showing a hinge of the sleeve of FIG. 35.
Figure 37:
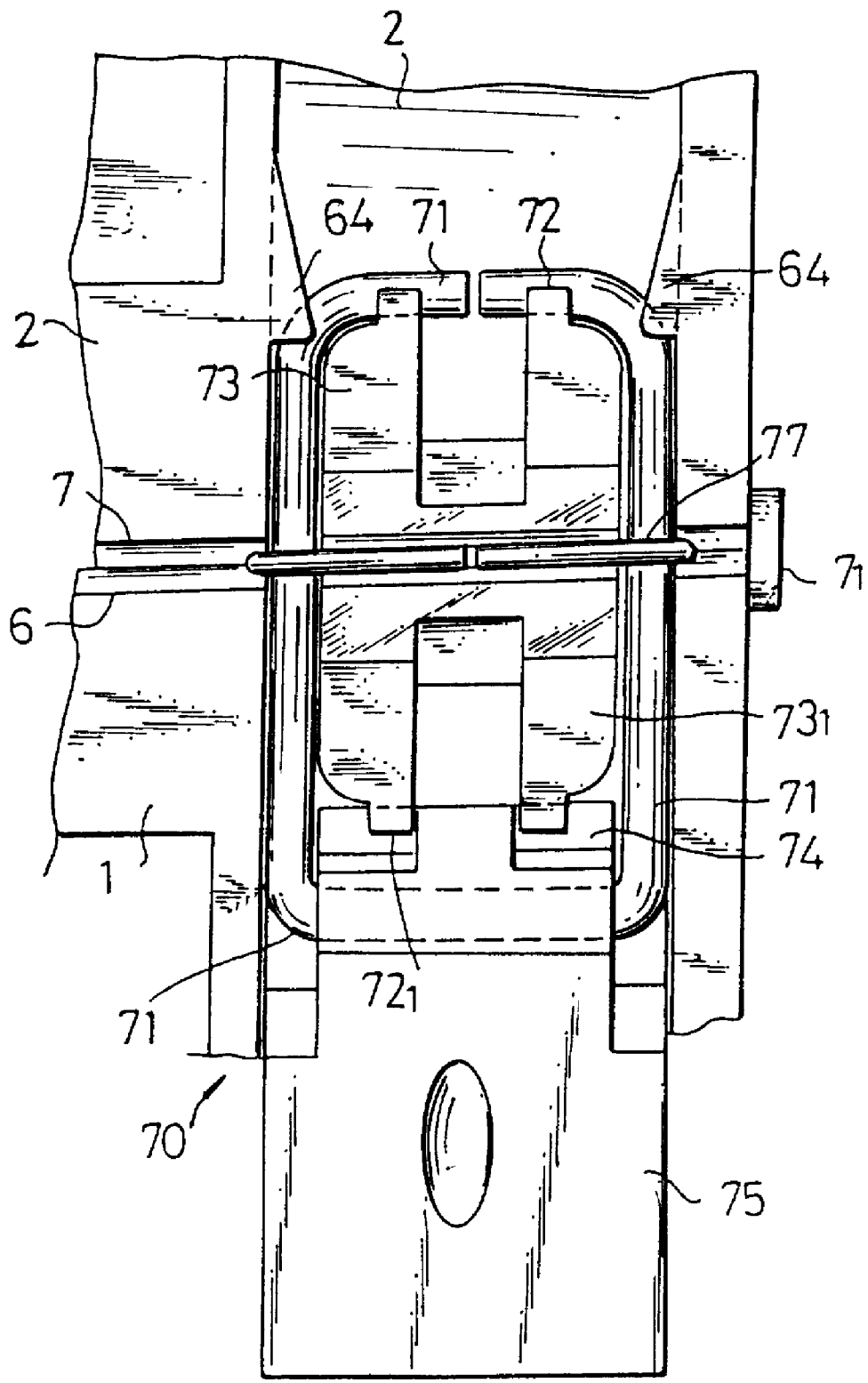
FIG. 37 is an enlarged front elevation view showing a fastener of the sleeve of FIG. 35.
Figure 38:
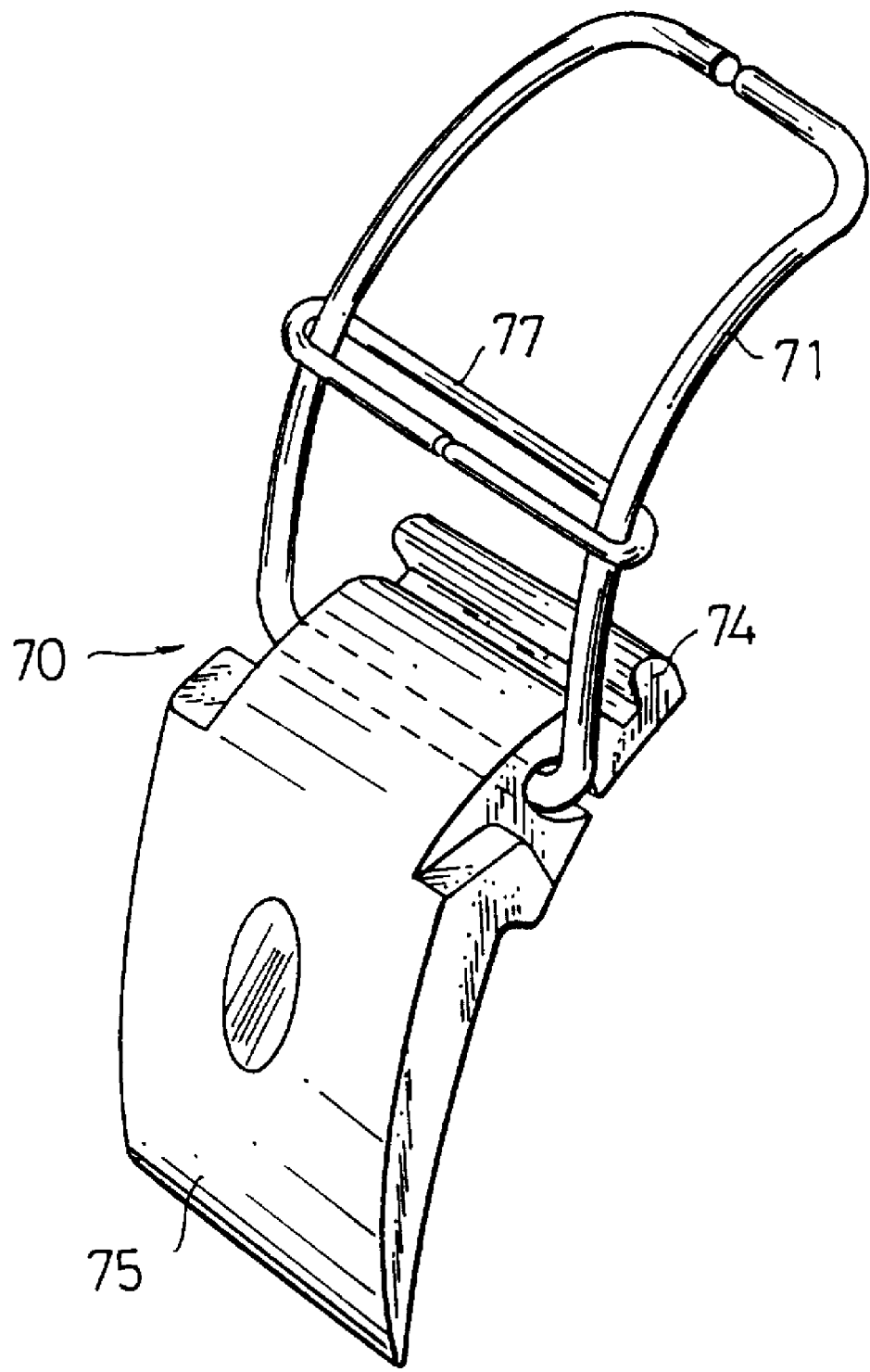
FIG. 38 is a perspective view showing a fastener of the sleeve of FIG. 35.
Figure 39:
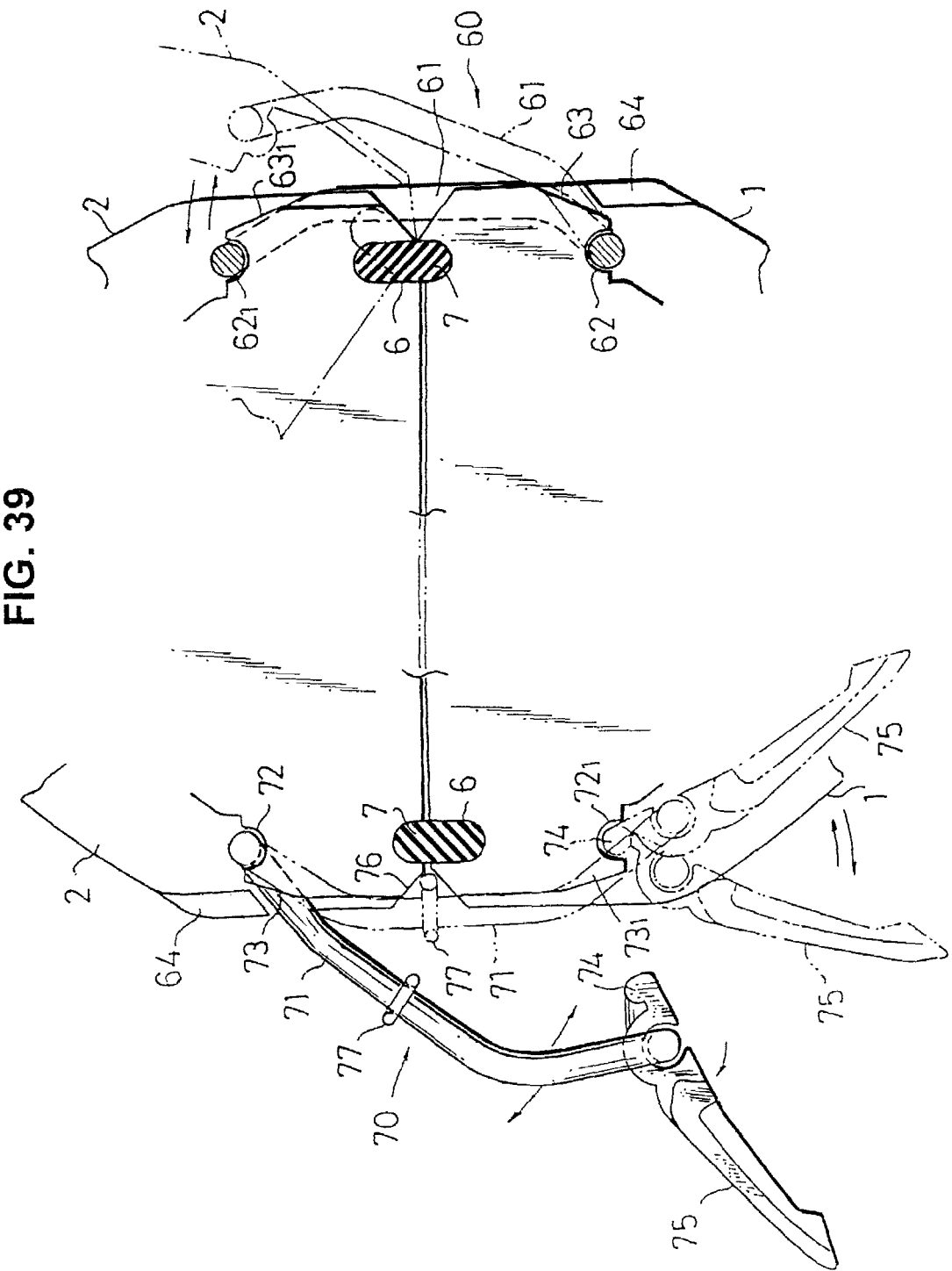
FIG. 39 is an enlarged side elevation view showing the manner of operation of a hinge and a fastener each incorporated in the sleeve of FIG. 35.
Figure 40A:
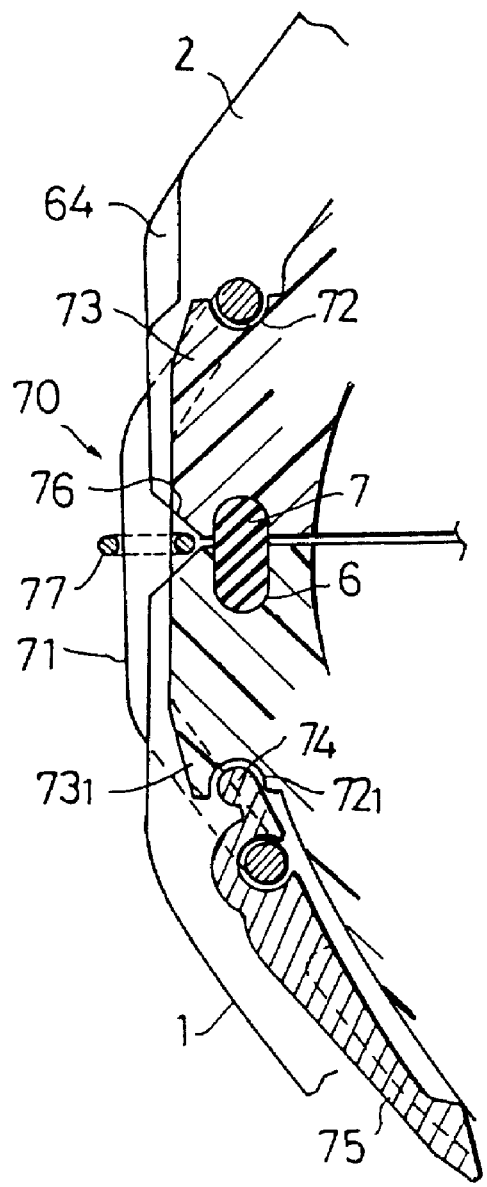
FIG. 40A is an enlarged vertical sectional view showing a fastener of the sleeve of FIG. 35 which is kept closed.
Figure 40B:
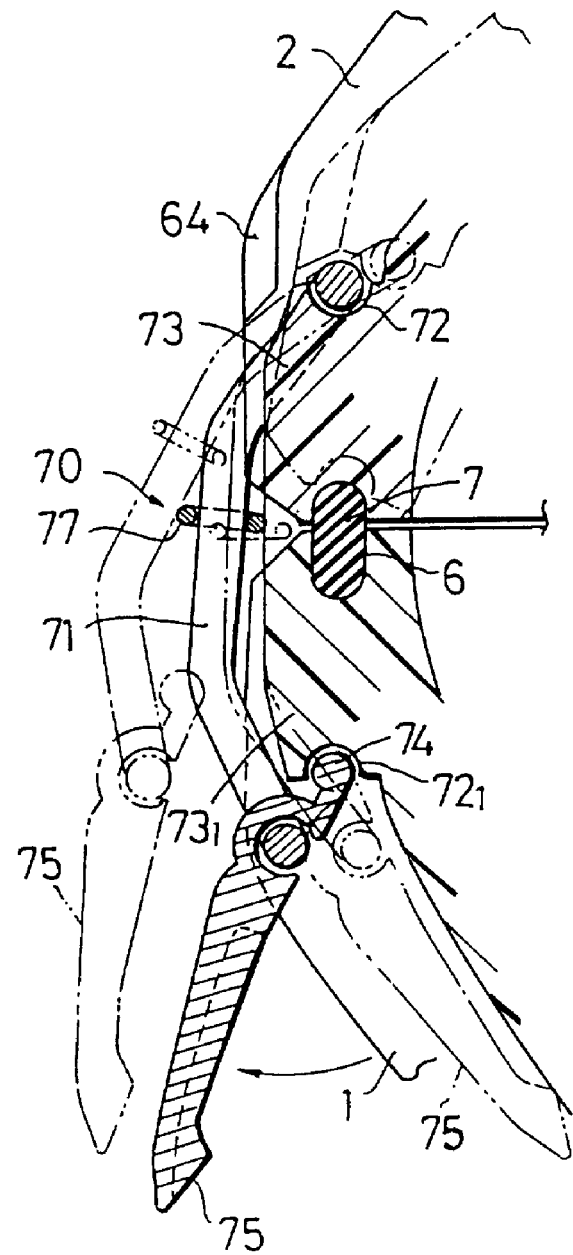
FIG. 40B is an enlarged vertical sectional view of the fastener shown in FIG. 35A which is being rendered open.

The fasteners 70 arranged on one side of the lower and upper sleeve members 1 and 2, as shown in FIG. 39, each include the loop-like ring 71 made of a metal rod and fitted in a ring insertion recess 72 formed at the ring receiving projection 73 provided on one side edge of the upper sleeve 2, the pivotable operation lever 75 provided with the holding projection 74, and a holding recess $72_1$ formed at the fastener receiving projection $73_1$ provided on one side edge of the lower sleeve member 1. The holding projection 74 of the operation lever 75 is disengageably held in the holding recess $72_1$, to thereby act as a supporting point. Also, the hinges 60, as shown in FIG. 36, each include a the loop-like ring 61 made of a metal rod and pivotally arranged in a ring insertion portion 62 formed at the ring receiving projection 63 provided on the other side edge of the lower sleeve member 1 and a ring holding recess $62_1$ which is formed at the hinge holding projection $63_1$ of the upper sleeve member 2 and in which the other end of the loop-like ring 61 is detachably held. Such construction of the hinge 60 and fastener 70 facilitates connection and disconnection between the lower sleeve member 1 and the upper sleeve member 2.

In addition, the loop-like rings 61 and 71 of the hinge 60 and fastener 70 arranged on the opposite ends of the sleeve in the longitudinal direction thereof are each movably provided with a retaining member 77 along an outer side of each of the gaskets 7 so as to be fitted in a recess 76 formed by chamfering outer side edges of the abutting joint surfaces of the lower and upper sleeve members 1 and 2. The retaining member 77 may be constructed of, for example, a ring rod. Such construction, when a sticky sealant is charged between the abutting joint surfaces of the sleeve members 1 and 2, effectively prevents runout of the sealant.

Reference numeral 64 designates stoppers each arranged in the vicinity of the ring receiving projection 63 of the lower sleeve member 1. The stoppers 64 each function to hold the loop-like ring 61 of the hinge 60 at a predetermined pivotal angle about the ring insertion portion 62. Mounting of the upper sleeve member 2 to the hinges 60 is carried out by abutting the loop-like ring 61 against the stopper 64 to keep the loop-like ring 61 from being pivotally moved and then placing the upper sleeve member 2 on the lower sleeve member 1. Then, the upper sleeve member 2 is raised about the gasket 7 positioned on a side of the hinges 60 to engage a free end of the loop-like ring 61 with the ring holding recess $62_1$ of the ring holding projection $63_1$. This results in a plurality of the loop-like rings 61 being concurrently engaged with the ring holding recesses $62_1$, so that the lower and upper sleeve members 1 and 2 may be joined on one side thereof to each other through the hinges 60 by a one-touch operation. Then, the sleeve members 1 and 2 are joined on the other side thereof to each other by means of the fasteners 70, as shown in FIG. 39.

The stopper mechanism for the hinges 60 may be constructed of end surfaces of the sleeve members 1 and 2 rendered opposite to each other when both side edges of the members 1 and 2 are aligned with each other, rather than or in place of the above-described stoppers 64. For this purpose, the end surfaces may each be partially formed into an outwardly downwardly slanting surface portion, so that an angle θ of 30 to 90 degrees may be defined between both slanting surface portions and therefore between both end surfaces. The end surfaces thus formed permit the slanting surface portions to be abutted against each other, to thereby function as the stopper mechanism, when both sleeve members 1 and 2 are relatively rotated in a direction of opening thereof. This results in an angle of opening of the sleeve members 1 and 2 being restricted to a range of between 30 degrees and 90 degrees. Such setting of the opening angle of the sleeve members 1 and 2 to the range substantially prevents excessive leaning of the upper sleeve member 2 toward a side opposite to that on which working takes places, to thereby ensure satisfactory workability.

In order to ensure that the loop-like rings 61 and 71 of the hinge 60 and fastener 70 are used in a way common to both, the ring insertion portion 62 and ring holding recess $62_1$ of the hinge 60 may be constructed in substantially the same manner as the ring insertion portion 72 and also, holding recess $72_1$ of the fastener 70; and also, the ring receiving projection 63 and ring holding projection $63_1$ of the hinge 60 may be constructed in substantially the same manner as the ring receiving projection 73 and fastener receiving projection $73_1$ of the fastener 70. This leads to simplification of a molding die for the sleeve members 1 and 2. Also, the loop-like ring 61 and loop-like ring 71 may be constructed in substantially the same manner, resulting in being used commonly on both side edges of the sleeve.

Figure 41A:
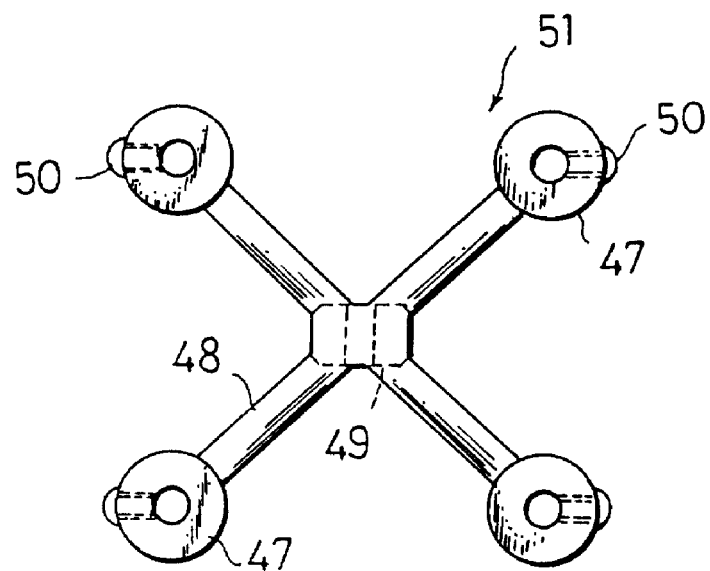
FIG. 41A is a front elevation view showing a cable tension member clamp.
Figure 41B:
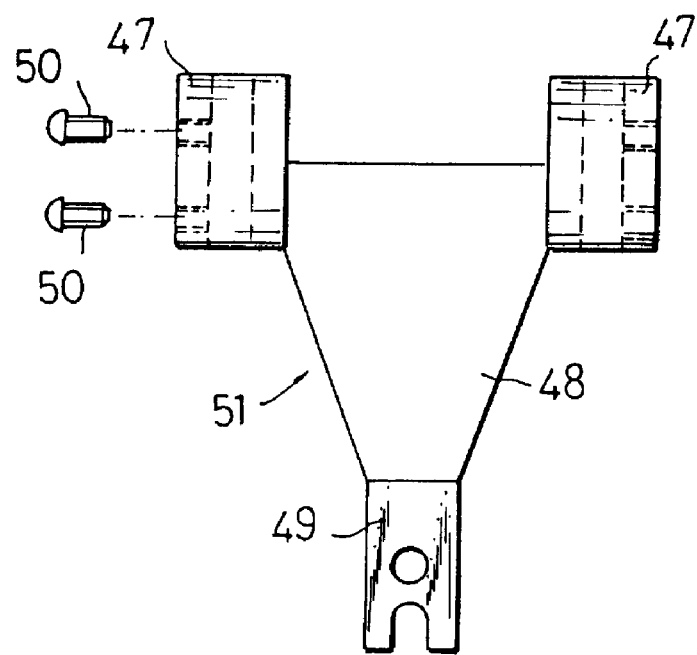
FIG. 41B is a plan view of the cable tension member shown in FIG. 41A.

The tension member holder 5, as shown in FIGS. 41A and 41B, is mounted thereon with a cable tension member clamp 51 of the single hole type or multi-hole type, which includes one or more cable insertion portions provided on a mount plate 49 through one or more arms 48. The cable tension member clamp 51 is secured in the lower sleeve member 1 to hold the tension member of the cable. For example, the cable tension member clamp 51 arranged in the sleeve member 1, as shown in FIGS. 41A and 41B, may be constructed in such a manner that one or more insertion members 47 through which tension members are fittedly inserted are mounted on the mount plate 49 through the arm or arms 48. The insertion members 47 are each provided with a fastening screw 50. The cable tension member clamp 51 thus constructed is mounted on the tension member holder 5 to thereby facilitate application of tension to a center of one or more cables.

Either the sleeve member 1 or 2 or the end plate 3 may be provided with a valve-equipped gas inlet (not shown), through which sealing gas is charged into the closure to ensure protection of the cable connection section in the closure.

Now, the manner of assembling of the closure for cable connection according to the illustrated embodiment thus constructed will be described hereinafter.

A jacket is removed by a required length from each of the cables 10 and an internal slot rod is cut off by a predetermined dimension from a position of the cable at which removal of the jacket was carried out, followed by adjusting of tension members in a predetermined dimension, resulting in preliminary arrangement for cable connection being completed. Then, the jacket at a predetermined position of each cable 10 is subjected to polishing and cleaning in a circumferential direction thereof and the spacer 43 is fitted on the cable 10 or the airtight tape is wound on the cable 10. The rigidity holding members 25 and $25_1$ are respectively removed from the cable guide hole 20 and slit 22 of each of the end plates 3 and then the thin-wall cap 21 and thin walls $22_1$ and $22_2$ of the end plate 3 are respectively removed from the end plate 3 by cutting to open the cable guide hole 20 and slit 22. Then, the slit 22 is expanded to guide the cable 10 through the expanded slit 22 to the cable guide hole 20, to thereby insert the cable 10 through the hole 20. Subsequently, the slit 22 of the end plate 3 is mounted therein with the rigidity holding seal member $25_1$ and then fitted therein with the opening prevention connection member 24, to thereby close the slit 22, followed by adhesion of the adhesive tape-like gasket 11 to the outer periphery of the end plate 3 so as to cover the outer end portion of the slit 22 positioned contiguous to the outer periphery while being conformed to the outer periphery of the end plate 3. Thereafter, the holding spacers 33 having an inner diameter required for the cable clamp 4 are fitted in the cable guide recess 16 and curved holding member 17 to fasten the jacket at the end of the cable 10 to the cable clamp 4 by tightening the screw 19 at torque of a predetermined level and to fasten the tension members to the cable tension member clamp 51 of the tension member holder 5 by fastening the screws 50 at torque of a predetermined level. Then, the gaskets 7 are interposedly arranged between the abutting joint surfaces of the lower and upper sleeve members 1 and 2, and the upper sleeve member 2 is pivotally moved about each of the hinges 60 on one side of the lower sleeve member 1 while being kept held on the lower sleeve member 1 by means of the hinges 60, resulting in the upper sleeve member 2 being placed on the lower sleeve member 1 while forcing the end plates 3 against the lower sleeve member 1, so that the abutting joint surfaces of the lower and upper sleeve members 1 and 2 may be abutted against each other. Then, the fasteners 70 are fastened in order from a central portion of the sleeve members to end portions thereof, to thereby provide the sleeve. As required, the sleeve thus provided may be wound thereon with bands to keep airtightness over a whole length thereof, to thereby exhibit airtightness with high reliability.

In the closure of the illustrated embodiment thus assembled, the gaskets 7 are each kept compressed in a major axis direction thereof between the abutting joint surfaces of the lower and upper sleeve members 1 and 2, resulting in the closure exhibiting increased airtightness at relatively reduced clamping force. Also, the spacer 43 or airtight tape is interposedly arranged in an axial direction of the cable 10 between the end plate 3 and the cable 10 so as to act as a seal material, to thereby stabilize a posture of the sleeve members 1 and 2, facilitate assembling of the sleeve and enhance airtightness of the sleeve. The gasket 7 is formed with an elliptic shape in section and arranged in the recesses 6 of the lower and upper sleeve members 1 and 2 while conforming a major axis thereof to a direction of clamping force between the sleeve members so as to attain a lip seal effect, so that assembling of the closure may be facilitated and airtightness thereof may be increased.

Now, the manner of disassembling of the closure will be described hereinafter.

First, the operation lever 75 of each of the fasteners 70 is pivotally moved to disengage the holding projection 74 thereof from the fastener receiving projection $73_1$ to release connection between the lower sleeve member 1 and the upper sleeve member 2, so that the upper sleeve member 2 may be readily pivotally moved about the hinges 60 for opening of the sleeve. Then, the opening prevention connection members 24 are removed from each of the end plates 3, followed by separation of the sleeve members 1 and 2 from each other, so that replacement of the cable 10 may be readily carried out.

As described above, connection or fastening between the abutting joint surfaces of the lower and upper sleeve members 1 and 2 while ensuring intimate contact therebetween may be attained by means of the hinges 60 on one of both sides of the sleeve members and the fasteners 70 on the other side thereof, resulting in workability being significantly improved. Also, rotation or pivotal movement of the upper sleeve member 2 about the hinges 60 in a closing direction thereof permits the gasket 7 in the recess 6 of the lower sleeve member 1 on the side of the hinges 60 to be automatically received in the recesses 6 of the upper and lower sleeve members 1 and 2 opposite to each other. The hinges 60 may be arranged on the upper and lower sleeve members 1 and 2 either securely or detachably.

The storage tray 15 for the fiber cable storage unit described above may be arranged in a stationary manner for every one optical fiber ribbon so as to realize mounting of 5 to 20 ribbons per one tray. In this instance, it is desirable that such storage trays are superposed in a multistage manner and connected together by the hinges so as to permit a tray at a position required to be open, to thereby improve workability.

The illustrated embodiment is constructed so as to carry out connection and fastening between the sleeve members on only one side of the sleeve. Such construction, even when a sufficient working space cannot be ensured on the other side of the sleeve, permits an assembling operation of the closure to be readily executed so long as a working space is maintained on the worker's side (the one side of the sleeve). When the sleeve members 1 and 2 which are connected together by means of the hinges 60 and fasteners 70 are rendered open with respect to each other, the stopper mechanism provided for each of the hinges 60 restricts an angle of opening between both sleeve members 1 and 2. Thus, relative pivotal movement of both sleeve members in a direction of opening thereof is limited to a predetermined angle, resulting in eliminating a disadvantage of causing one of the sleeve members to be excessively open when the other sleeve member is engaged with the connection section, to thereby be pivotally moved toward a side opposite to a working side, leading to a deterioration in workability.

Also, in the closure of the illustrated embodiment, the lower and upper sleeve members 1 and 2 are constructed into substantially the same configuration, so that mounting of fastener members and hinge members for connection between both sleeve members may be carried out without paying attention to discrimination between both sleeve members. Also, this permits both sleeve members to be produced by means of a single molding die.

The sleeve members may each be formed on both inner and outer surfaces thereof with a corrugated shape and made of a material exhibiting satisfactory compression set such as a styrene or olefin thermoplastic elastomer material. Such construction permits manufacturing of the sleeve to be readily accomplished at a reduced cost and facilitates recovery and recycling of the sleeve because of any vulcanizing treatment being eliminated.

As can be seen from the foregoing, the closure for cable connection according to the present invention permits the sleeve members to be safely fastened to each other by means of the fasteners while abutting the abutting joint surfaces of the sleeve member against each other, resulting in facilitating both an operation of joining the sleeve members together and an operation of protecting the cable connection section, as well as ensuring satisfactory sealing with increased reliability due to uniform pressing against the end plates while minimizing the number of locations at which fastening is carried out. Also, it ensures simplified handling of the closure and facilitates assembling and disassembling thereof while keeping a posture of the sleeve stable. Furthermore, it permits a limited number of components to be widely applied to various cables of different diameters and to positively fix them in the closure, to thereby reduce necessary time to assemble or disassemble the closure, as well as to eliminate troubles in keeping or handling of the components for installation or maintenance, so that a closure for cable connection having a simplified structure can be produced at a reduced cost.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A closure for a cable connection comprising: a pair of sleeve members formed with a semicylindrical shape and joined to each other in a manner to be vertically separable from each other, resulting in providing a cylindrical sleeve adapted to surround a cable connection section, said sleeve members each having abutting joint surfaces formed on both sides thereof, through which said sleeve members are joined together; end plates arranged on opposite ends of said sleeve and each formed with at least one cable guide hole through which a cable connected to said cable connection section is adapted to be inserted, said end plates each integrally provided on the outer periphery surface thereof with a sealing member including a plurality of peak and valley shaped grooves which are integrally formed on the outer periphery surface of the end plate, said peak and valley shaped grooves extending in a circumferential direction of the end plate so as to be abutted against the inner surface of the sleeve; hinges and fasteners releasably hooked between said sleeve members to integrally connect said sleeve members to each other through said abutting joint surfaces arranged opposite to each other; said end plates each being formed of rubber elastic material with a slit in a manner to extend from said cable guide hole to a portion of said end plate in proximity to an outer periphery of said end plate so as to permit a wall of said end plate to open by cutting along said slit; said cable guide hole being provided thereon with a thin-wall cap capable of being removed by cutting and said slit being detachably fitted therein with a rigidity holding member; and an adhesive tape gasket locally arranged between said outer periphery of said end plate and an inner surface of said sleeve members so as to cover an outer end of said slit, said gasket arranged on the outer periphery surface of the end plate by adhesion while being conformed to the outer periphery of the end plate and the plurality of peak and valley shaped grooves of the sealing member.

2. A closure for a cable connection as defined in claim 1, wherein at least one of said end plates is removably fitted therein with at least one opening prevention connection member which extends over both sides of said slit; and said at least one of said end plates is removably fitted therein with a second rigidity holding member in a manner to be positioned at a central portion thereof between the cable guide holes and abutted against an end wall of said sleeve.

3. A closure for a cable connection as defined in claim 2, wherein said opening prevention connection member and second rigidity holding member are fitted in respective recesses formed on an outer surface of said end plate and provided on surfaces thereof opposite to said end plate with mating engagements, respectively.

4. A closure for a cable connection as defined in claim 1, wherein said cable guide hole of said end plate is detachably fitted therein with a third rigidity holding member.

5. A closure for a cable connection as defined in claim 1, wherein said abutting joint surfaces of each of said upper and lower sleeve members are each provided thereon with a recess for fittedly holding a second gasket therein in a manner to extend in a longitudinal direction thereof;

said recess being so formed that opposite ends thereof are each reduced in width, to thereby provide a gasket press-fit portion for pressedly fittedly holding said second gasket therein.

6. A closure for a cable connection as defined in claim 1, wherein said abutting joint surfaces of each of said upper and lower sleeve members are each provided thereon with a recess for fittedly holding a gasket therein in a manner to extend in a longitudinal direction thereof;

said upper and lower sleeve members are each provided with barriers at different portions thereof defined along said recess and on both side edges thereof deviated from each other in the longitudinal direction thereof; and said barriers of one of said sleeve members are mutually abutted against an inner surface of the other sleeve member to join said sleeve members to each other.

7. A closure for a cable connection as defined in claim 1, further comprising an airtight tape wound around an outer periphery of the cable which extends through said cable guide hole so as to provide sealing between the outer periphery of the cable and an inner periphery of said cable guide hole;

said airtight tape being made of a thermoplastic rubber composition which exhibits a penetration of 40 to 90 ($1^{-1}$ mn), an elongation of 1500 to 2000 percent and a tensile stress of 0.5 to 1.5 kgf/cm$^2$.

8. A closure for a cable connection as defined in claim 1, wherein said gasket is made of unvulcanized butyl rubber material.

9. A closure for a cable connection comprising: a pair of sleeve members formed with a semicylindrical shape and joined to each other in a manner to be vertically separable from each other, resulting in providing a cylindrical sleeve which is adapted to surround a cable connection section, said sleeve members each having abutting joint surfaces formed on both sides thereof, through which said sleeve members are joined together;

end plates arranged on opposite ends of said sleeve and each formed with at least one cable guide hole through which a cable connected to said cable connection section is adapted to be inserted;

hinges and fasteners releasably hooked between said sleeve members to integrally connect said sleeve members to each other through said abutting joint surfaces arranged opposite to each other;

said end plates each being formed with a slit in a manner to extend from said cable guide hole to a portion of said end plate in proximity to an outer periphery of said end plate so as to permit a wall of said end plate to open by cutting along said slit;

said cable guide hole being provided thereon with a thin-wall cap capable of being removed by cutting and said slit being detachably fitted therein with a rigidity holding member; and at least one cable clamp arranged opposite to one of said end plates and provided with at least one cable insertion portion through which the cable is adapted to be fittedly inserted, said cable clamp including a clamp body formed with at least one cable guide recess and at least one curved holding member arranged opposite to said cable guide recess, said curved holding member being fastened to said clamp body of said cable clamp by means of a mounting member;

said cable guide recess and curved holding member being each provided with holding spacers detachable therefrom in a manner to be opposite to each other, respectively;

said holding spacers respectively fitted in the cable guide recess of the clamp body and the curved holding member each having a concave inner periphery adapted to abut against the cable.

10. A closure for a cable connection as defined in claim 9, wherein said end plate is removably fitted therein with at least one opening prevention connection member which extends over both sides of said slit, said end plate removably fitted therein with a second rigidity holding member in a manner to be positioned at a central portion thereof between the cable guide holes and abutted against an end wall of said sleeve, wherein said opening prevention connection member and second rigidity holding member are fitted in respective recesses formed on an outer surface of said end plate and provided on surfaces thereof opposite to said end plate with mating engagements, respectively.

11. A closure for a cable connection as defined in claim 9, wherein said end plate is provided on an inner surface thereof with a holder in a manner to be projected therefrom, said holder being formed with a recess; and said cable clamp is provided with a projection adapted to fit in said recess of said holder.

12. A closure for a cable connection as defined in claim 9, wherein said curved holding member of said cable clamp is constructed in the form of an arm member which is provided at one end thereof with a pivotal pin for enabling pivotal movement of said curved holding member and at the other end thereof acting as a free end thereof with an insertion hole for said mounting member; and said pivotal pin is detachably inserted through a holding recess formed on said clamp body of said cable clamp.

13. A closure for a cable connection as defined in claim 12, wherein said mounting member for fastening said curved holding member to said clamp body of said cable clamp comprises a screw threadedly inserted into a pivotal element pivotally supported on said clamp body of said cable clamp;

said screw including a screw head held on said free end of said curved holding member.

14. A closure for a cable connection as defined in claim 12, wherein said holding spacers are each constructed of an arcuate element formed on an arcuate inner peripheral surface thereof with a peak-and-valley shaped groove and on an outer peripheral surface thereof with a projection;

said projection being detachably fitted in a recess formed at a corresponding one of said cable guide recess and curved holding member.

15. A closure for a cable connection as defined in claim 9, wherein said mounting member for fastening said curved holding member to said clamp body of said cable clamp comprises a screw threadedly inserted into a pivotal element pivotally supported on said clamp body of said cable clamp;

said screw including a screw head held on said free end of said curved holding member.

16. A closure for a cable connection as defined in claim 9, wherein said holding spacers are each constructed of an arcuate element formed on an arcuate inner peripheral surface thereof with a peak-and-valley shaped groove and on an outer peripheral surface thereof with a projection;

said projection being detachably fitted in a recess formed at a corresponding one of said cable guide recess and curved holding member.

17. A closure for a cable connection as defined in claim 9, wherein said holding spacers are each slidably mounted on a fitting surface of a corresponding one of said cable guide recess and curved holding member; and said holding spacers are each formed thereon with at least one arcuate surface which corresponds to the outer periphery of the cable.

18. A closure for a cable connection as defined in claim 17, wherein said cable clamp includes distance pieces which are interposedly arranged between a corresponding one of said holding spacers and said cable guide recess and between a corresponding one of said holding spacers and said curved holding member, respectively.

19. A closure for a cable connection as defined in claim 17, wherein said holding spacers each comprise a first spacer member and a second spacer member which are detachably joined together through arcuate surfaces formed thereon in correspondence to the outer periphery of the cable.

20. A closure for a cable connection as defined in claim 19, wherein the arcuate surface of said first spacer member is formed to be concave and provided thereon with a plurality of ribs which are projectedly arranged at intervals and which extend in a direction perpendicular to an axis of the cable; and the arcuate surface of said second spacer member is formed to be convex and formed thereon with a plurality of grooves into which said ribs of said first spacer member are fitted.

21. A closure for a cable connection as defined in claim 19, wherein the arcuate surface of said first spacer member is a first concave surface of a large radius and formed therein with a fitting hole;

said first spacer member is formed with a second concave surface of a small radius on an end thereof remote from said first concave surface;

the arcuate surface of said second spacer member is a convex surface conforming with said first concave surface of said first spacer member and provided thereon with a connection rod adapted to be fitted in said fitting hole of said first spacer member; and said second spacer member is formed with a third concave surface of an intermediate radius on an end thereof remote from said convex surface.

22. A closure for a cable connection as defined in claim 17, wherein said holding spacers are each provided on said arcuate surface with a plurality of ribs which are projectedly arranged at intervals and extend in a direction perpendicular to an axis of the cable.

23. A closure for a cable connection as defined in claim 19, wherein said holding spacers are each formed with a pair of arcuate surfaces of different curvatures which are adaptable to different outer peripheries of cables and which are curved in opposite directions.

24. A closure for a cable connection as defined in claim 17, wherein said clamp body of said cable clamp is provided with a loosening prevention piece for preventing a corresponding one of said holding spacers from loosening; and said corresponding one of said holding spacers includes an engagement pawl and is provided with a stopper for fixing said engagement pawl to said loosening prevention piece.

25. A closure for a cable connection as defined in claim 17, wherein said fitting surface and a mating surface of each of said holding spacers are respectively formed with a plurality of serrated protrusions which extend in parallel with an axis of the cable.

26. A closure for a cable connection as defined in claim 9, further comprising an airtight tape wound around an outer periphery of the cable which extends through said cable guide hole so as to provide sealing between the outer periphery of the cable and an inner periphery of said cable guide hole;

said airtight tape being made of a thermoplastic rubber composition which exhibits a penetration of 40 to 90 ($10^{-1}$ mm), an elongation of 1500 to 2000 percent and a tensile stress of 0.5 to 1.5 kgf/cm$^2$.

27. A closure for a cable connection as defined in claim 9, wherein said holding spacers are each constructed of an arcuate element formed on an arcuate inner peripheral surface thereof with at least one peak-and-valley shaped groove.

28. A closure for a cable connection comprising: a pair of sleeve members formed with a semicylindrical shape and joined to each other in a manner to be vertically separable from each other, resulting in providing a cylindrical sleeve adapted to surround a cable connection section, said sleeve members each having abutting joint surfaces formed on both sides thereof, through which said sleeve members are joined together; end plates arranged on opposite ends of said sleeve and each formed with at least one cable guide hole through which a cable connected to said cable connection section is adapted to be inserted, said end plates each integrally provided on the outer periphery surface thereof with a sealing member including a plurality of peak and valley shaped grooves which are integrally formed on the outer periphery surface of the end plate, said peak and valley shaped grooves extending in a circumferential direction of the end plate so as to be abutted against the inner surface of the sleeve; hinges and fasteners releasably hooked between said sleeve members to integrally connect said sleeve members to each other through said abutting joint surfaces arranged opposite to each other; said end plates each being formed of rubber elastic material with a slit in a manner to extend from said cable guide hole to a portion of said end plate in proximity to an outer periphery of said end plate so as to permit a wall of said end plate to open by cutting along said slit; said cable guide hole being provided thereon with a thin-wall cap capable of being removed by cutting and said slit being detachably fitted therein with a rigidity holding member; an adhesive tape gasket locally arranged between said outer periphery of said end plate and an inner surface of said sleeve members so as to cover an outer end of said slit, said gasket arranged on the outer periphery surface of the end plate by adhesion while being conformed to the outer periphery of the end plate and the plurality of peak and valley shaped grooves of the sealing member; and at least one cable clamp arranged between said opposite ends of said sleeve and provided with at least one cable insertion portion through which the cable is adapted to be fittedly inserted, wherein said cable clamp includes a clamp body formed with at least one cable guide recess and a pivotal support, at least one curved holding member is arranged opposite to said cable guide recess and pivotally supported by said pivotal support, said curved holding member is fastened at a free end thereof to said clamp body of said cable clamp by means of a mounting member, and said cable guide recess and curved holding member are detachably provided with holding spacers in a manner to be opposite to each other, respectively.

29. A closure for a cable connection comprising: a pair of sleeve members formed with a semicylindrical shape and joined to each other in a manner to be vertically separable from each other, resulting in providing a cylindrical sleeve adapted to surround a cable connection section, said sleeve members each having abutting joint surfaces formed on both sides thereof, through which said sleeve members are joined together; end plates arranged on opposite ends of said sleeve and each formed with at least one cable guide hole through which a cable connected to said cable connection section is adapted to be inserted, said end plates each integrally provided on the outer periphery surface thereof with a sealing member including a plurality of peak and valley shaped grooves which are integrally formed on the outer periphery surface of the end plate, said peak and valley shaped grooves extending in a circumferential direction of the end plate so as to be abutted against the inner surface of the sleeve; hinges and fasteners releasably hooked between said sleeve members to integrally connect said sleeve members to each other through said abutting joint surfaces arranged opposite to each other; said end plates each being formed of rubber elastic material with a slit in a manner to extend from said cable guide hole to a portion of said end plate in proximity to an outer periphery of said end plate so as to permit a wall of said end plate to open by cutting along said slit; said cable guide hole being provided thereon with a thin-wall cap capable of being removed by cutting and said slit being detachably fitted therein with a rigidity holding member; wherein said hinges include a plurality of first ring receiving portions formed at a portion of one of said sleeve members in proximity to one of side edges thereof in a manner to be spaced from each other, hinge members each constituted by a first ring pivotally arranged at a corresponding one of said first ring receiving portions and a plurality of holding recesses for said hinge members, which holding recesses are arranged at a portion of the other of said sleeve members in proximity to one of side edges therein in a manner to be spaced from each other; and wherein said fasteners include a plurality of second ring receiving portions formed at a portion of said other sleeve member in proximity to the other side edge in a manner to be spaced from each other, second rings each pivotally arranged at a corresponding one of said second ring receiving portions, operation levers each pivotally supported at a corresponding one of said second rings and provided at a distal end thereof with a holding projection, and a plurality of fastener receiving portions which are formed at a portion of said one sleeve member in proximity to the other side edge thereof in a manner to be spaced from each other and in which said holding projections of said operation levers are respectively fitted.

30. A closure for a cable connection as defined in claim 29, further comprising gaskets arranged between said abutting joint surfaces of said sleeve members;
   said abutting joint surfaces each being chamfered on an outer edge thereof so as to form a recess between the outer edges thereof;
   said second ring of at least one of said fasteners including a retaining member fitted in said recess of said outer edges of said abutting joint surface so as to be arranged along an outside of one of said gaskets.

31. A closure for a cable connection as defined in claim 30, wherein said first ring of at least one of said hinges includes a retaining member fitted in said recess of said outer edges of said abutting joint surface so as to be arranged along an outside of one of said gaskets.

32. A closure for a cable connection as defined in claim 31, wherein said retaining member is arranged at said ring of each of the fastener and hinge positioned on opposite ends of said sleeve in a longitudinal direction thereof.

33. A closure for a cable connection as defined in claim 29, further comprising a stopper for holding said first ring of the hinge at a predetermined angle when said first ring is pivotally moved about a ring insertion portion formed at said first ring receiving portion;
   said stopper being projectedly arranged in proximity to said ring receiving portion of one of said sleeve members.

* * * * *

UNITED STATES PATENT AND TRADEMARK OFFICE
CERTIFICATE OF CORRECTION

PATENT NO. : 7,316,518 B2
APPLICATION NO. : 08/799400
DATED : January 8, 2008
INVENTOR(S) : Daijiro Sasaki et al.

It is certified that error appears in the above-identified patent and that said Letters Patent is hereby corrected as shown below:

At Column 7, line 63, after "member clamp 5", please replace "is" with "are".
At Column 10, line 58, after "which permits", please replace "them" with "it".
At Column 12, line 29, please replace "hoding" with "holding".
At Column 14, line 36, after "resulting", please replace "them" with "it".
At Column 18, line 45, please replace "($1^{-1}$ mn)" with "($10^{-1}$ mn)".
At Column 20, line 66, please replace "19" with "17".
At Column 21, line 26, please replace "elongatlon" with "elongation".

Signed and Sealed this

Twenty-fourth Day of February, 2009

JOHN DOLL
*Acting Director of the United States Patent and Trademark Office*